US012683669B2

(12) United States Patent
Kim et al.

(10) Patent No.: US 12,683,669 B2
(45) Date of Patent: Jul. 14, 2026

(54) METHOD AND APPARATUS FOR CSI FEEDBACK PERFORMED BY ONLINE LEARNING-BASED UE-DRIVEN AUTOENCODER

(71) Applicant: SAMSUNG ELECTRONICS CO., LTD., Suwon-si (KR)

(72) Inventors: Wonjun Kim, Suwon-si (KR); Suhwook Kim, Suwon-si (KR); Seunghyun Lee, Suwon-si (KR); Hyeondeok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 18/351,220

(22) Filed: Jul. 12, 2023

(65) Prior Publication Data

US 2024/0030989 A1 Jan. 25, 2024

(30) Foreign Application Priority Data

Jul. 13, 2022 (KR) ........................ 10-2022-0086304

(51) Int. Cl.
*G06N 3/08* (2023.01)
*H04B 7/06* (2006.01)
(52) U.S. Cl.
CPC ......... *H04B 7/0658* (2013.01); *H04B 7/0626* (2013.01)
(58) Field of Classification Search
None
See application file for complete search history.

(56) References Cited

U.S. PATENT DOCUMENTS

| | | | |
|---|---|---|---|
| 2016/0157218 A1 | 6/2016 | Nam et al. | |
| 2021/0125077 A1* | 4/2021 | Fidler | G06N 3/045 |
| 2021/0195462 A1* | 6/2021 | Pezeshki | G06N 3/088 |
| 2022/0094411 A1 | 3/2022 | Yoo et al. | |
| 2023/0283340 A1* | 9/2023 | Niu | H04W 28/0215 |
| | | | 375/262 |
| 2024/0095536 A1* | 3/2024 | Lin | G06N 3/084 |

FOREIGN PATENT DOCUMENTS

| | | | |
|---|---|---|---|
| EP | 3427405 B1 | 7/2020 | |
| KR | 20160058716 A | 5/2016 | |
| WO | 2021208061 A1 | 10/2021 | |
| WO | 2022014728 A1 | 1/2022 | |
| WO | 2022041196 A1 | 3/2022 | |

* cited by examiner

*Primary Examiner* — Minh Trang T Nguyen

(57) ABSTRACT

The disclosure relates to a 5G or 6G communication system for supporting a higher data transfer rate than a 4G communication system such as LTE. According to an embodiment, a method performed by a terminal in a wireless communication system may include transmitting, to a base station, training capability information of the terminal relating to artificial intelligence (AI) model training of an autoencoder configured to compress and reconstruct feedback information for a channel state information-reference signal (CSI-RS), receiving, from the base station, information on a training completion time point and decoder information determined based on the training capability information, generating a training dataset for the autoencoder, based on at least one received CSI-RS, training the autoencoder, based on the decoder information, the information on the training completion time point, and the generated training dataset, and transmitting training result information of the autoencoder to the base station.

20 Claims, 15 Drawing Sheets

Figure 7:
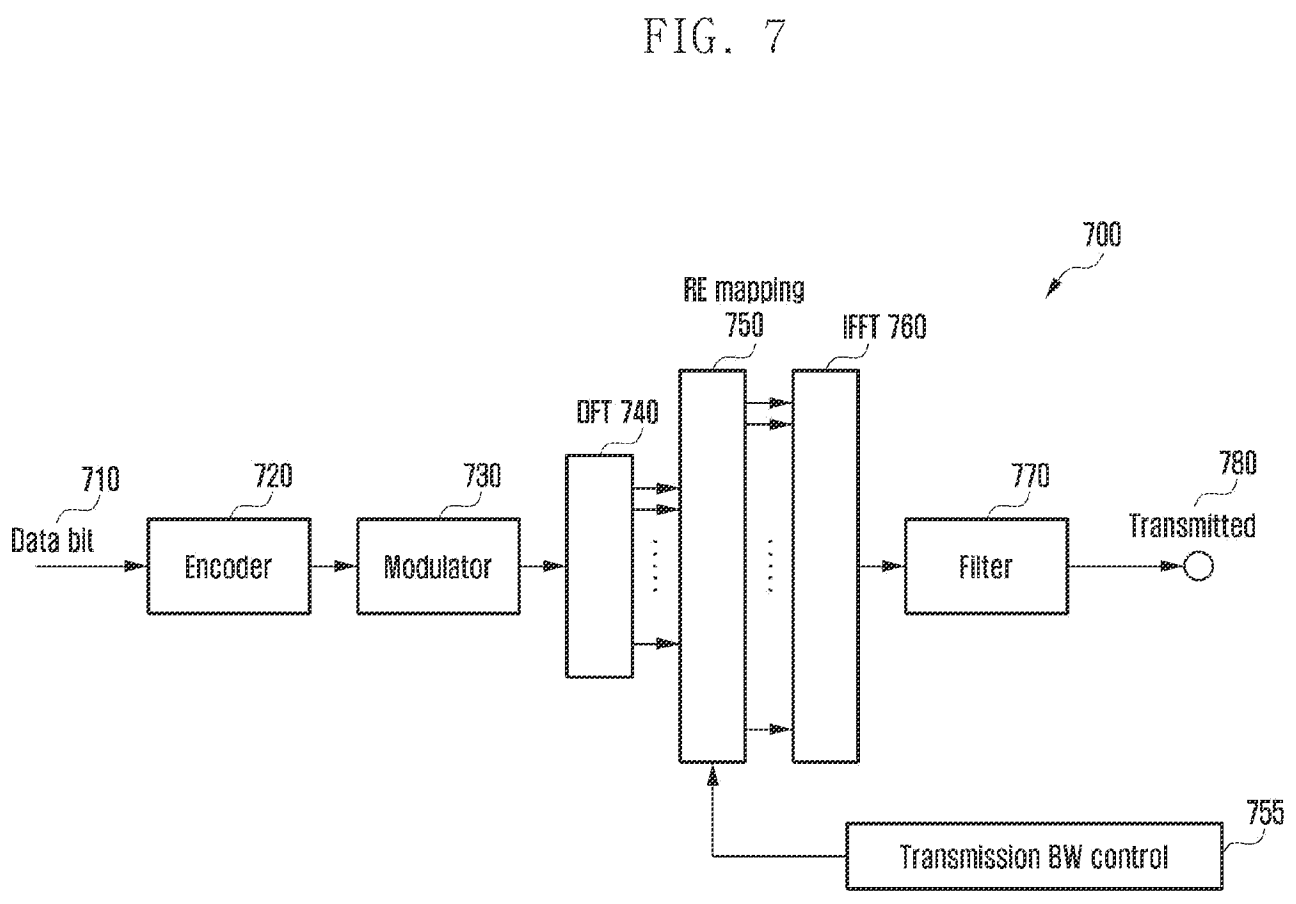

710 Data bit

720 Encoder

730 Modulator

DFT 740

RE mapping 750

IFFT 760

755 Transmission BW control

770 Filter

780 Transmitted

Train autoencoder ~1121

Transmit result of training to base station ~1123

Receive indication for additional training from base station ~1125

Replace decoder or generate additional training dataset according to received indication ~1127

Perform retraining or additional training of autoencoder ~1129

METHOD AND APPARATUS FOR CSI FEEDBACK PERFORMED BY ONLINE LEARNING-BASED UE-DRIVEN AUTOENCODER

CROSS-REFERENCE TO RELATED APPLICATIONS

This application is based on and claims priority under 35 U.S.C. § 119 to Korean Patent Application No. 10-2022-0086304, filed on Jul. 13, 2022, in the Korean Intellectual Property Office, the disclosure of which is herein incorporated by reference in its entirety.

BACKGROUND

1. Field

The disclosure relates to a communication system and, particularly, to a method and an apparatus for training an autoencoder, based on artificial intelligence/machine learning (AI/ML) so as to increase the transmission efficiency of feedback information for a channel state information-reference signal (CSI-RS).

2. Description of Related Art

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the $\frac{1}{10}$ radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collison avoidance based on a prediction of spectrum usage: an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

Under such a 6G communication system, there is a need for attempts to also utilize AI technologies to improve the transmission efficiency of feedback information for a channel estimation value generated through a CSI-RS which a terminal receives from a base station.

The above information is presented as background information only to assist with an understanding of the disclosure. No determination has been made, and no assertion is made, as to whether any of the above might be applicable as prior art with regard to the disclosure.

SUMMARY

An aspect of the disclosure is to perform, by a UE and a base station, encoding and decoding of CSI-RS feedback information by using data collected in real time by the UE, without using a pre-trained AI model.

An aspect of the disclosure is to improve CSI-RS feedback transmission efficiency in a situation where a UE travels at a high speed or a situation where a surrounding channel environment of the UE changes rapidly.

In order to solve the problem described above, an embodiment of the disclosure may provide a method performed by a terminal in a wireless communication system, the method including transmitting, to a base station, training capability information of the terminal relating to artificial intelligence (AI) model training of an autoencoder configured to compress and reconstruct feedback information for a channel state information-reference signal (CSI-RS), receiving, from the base station, information on a training completion time point and decoder information determined based on the training capability information, generating a training dataset for the autoencoder, based on at least one received CSI-RS, training of the autoencoder, based on the decoder information, the information on the training completion time point, and the generated training dataset, and transmitting training result information of the autoencoder to the base station.

In order to solve the problem described above, an embodiment of the disclosure may provide a terminal in a wireless communication system, the terminal including a transceiver configured to transmit and receive a signal, and a controller coupled to the transceiver, wherein the controller is configured to transmit, to a base station, training capability information of the terminal relating to artificial intelligence (AI) model training of an autoencoder configured to compress and reconstruct feedback information for a channel state information-reference signal (CSI-RS), receive, from the base station, information on a training completion time point and decoder information determined based on the training capability information, generate a training dataset for the autoencoder, based on at least one received CSI-RS, train the autoencoder, based on the decoder information, the information on the training completion time point, and the generated training dataset, and transmit training result information of the autoencoder to the base station.

In order to solve the problem described above, an embodiment of the disclosure may provide a method performed by a base station in a wireless communication system, the method including receiving, from a terminal, training capability information of the terminal relating to artificial intelligence (AI) model training of an autoencoder configured to compress and reconstruct feedback information for a channel state information-reference signal (CSI-RS), determining decoder information, based on the training capability information and transmitting the determined decoder information and information on a training completion time point to the terminal, transmitting at least one CSI-RS to the terminal, and receiving training result information of the autoencoder from the terminal.

In order to solve the problem described above, an embodiment of the disclosure may provide a base station in a wireless communication system, the base station including a transceiver configured to transmit and receive a signal, and a controller coupled to the transceiver, wherein the controller is configured to receive, from a terminal, training capability information of the terminal relating to artificial intelligence (AI) model training of an autoencoder configured to compress and reconstruct feedback information for a channel state information-reference signal (CSI-RS), determine decoder information, based on the training capability information and transmit the determined decoder information and information on a training completion time point to the terminal, and receive training result information of the autoencoder from the terminal.

In order to solve the problem described above, an embodiment of the disclosure may provide a method performed by a terminal in a wireless communication system, the method including receiving decoder information regarding at least one decoder structure from a base station, transmitting, to the base station, training capability information of the terminal relating to artificial intelligence (AI) model training of an autoencoder configured to compress and reconstruct feedback information for a channel state information-reference signal (CSI-RS), receiving, from the base station, information on a training completion time point determined based on the training capability information, generating a training dataset for the autoencoder, based on at least one received CSI-RS, determining decoder information to be used for training of the autoencoder, based on the training capability information, training of the autoencoder, based on the decoder information, the information on the training completion time point, and the generated training dataset, and transmitting the decoder information and training result information of the autoencoder to the base station.

In order to solve the problem described above, an embodiment of the disclosure may provide a method performed by a base station in a wireless communication system, the method including transmitting decoder information regarding at least one decoder structure to a terminal, receiving, from the terminal, training capability information of the terminal relating to artificial intelligence (AI) model training of an autoencoder configured to compress and reconstruct feedback information for a channel state information-reference signal (CSI-RS), determining information on a training completion time point, based on the training capability information and transmitting the determined information on the training completion time point to the terminal, and receiving, from the terminal, information on a decoder structure used by the terminal for training and training result information of the autoencoder.

In order to solve the problem described above, an embodiment of the disclosure may provide a terminal in a wireless communication system, the terminal including a transceiver configured to transmit and receive a signal, and a controller coupled to the transceiver, wherein the controller is configured to receive decoder information regarding at least one decoder structure from a base station, transmit, to the base station, training capability information of the terminal relating to artificial intelligence (AI) model training of an autoencoder configured to compress and reconstruct feedback information for a channel state information-reference signal (CSI-RS), receive, from the base station, information on a training completion time point determined based on the training capability information, generate a training dataset for the autoencoder, based on at least one received CSI-RS, determine decoder information to be used for training of the autoencoder, based on the training capability information, train the autoencoder, based on the decoder information, the information on the training completion time point, and the generated training dataset, and transmit the decoder information and training result information of the autoencoder to the base station.

In order to solve the problem described above, an embodiment of the disclosure may provide a base station in a wireless communication system, the base station including a transceiver configured to transmit and receive a signal, and a controller coupled to the transceiver, wherein the controller is configured to transmit decoder information regarding at least one decoder structure to a terminal, receive, from the terminal, training capability information of the terminal relating to artificial intelligence (AI) model training of an autoencoder configured to compress and reconstruct feedback information for a channel state information-reference signal (CSI-RS), determine information on a training completion time point, based on the training capability information, transmit the determined information on the training completion time point to the terminal, and receive, from the terminal, information on a decoder structure used by the terminal for training and training result information of the autoencoder.

According to the disclosure, a UE may train an autoencoder by using data collected in real time without using a pre-trained AI model by the UE and a base station.

According to the disclosure, a UE-specific autoencoder may be trained and used. According to the disclosure, a UE performs online learning for training with data collected in real time, and thus it may be possible to distribute a UE-specific autoencoder.

According to the disclosure, autoencoder performance deterioration may be prevented in a situation where a UE travels at a high speed or a situation where the UE or a surrounding channel environment changes dynamically.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 illustrates a transmitter block diagram for a PDSCH in a subframe according to embodiments of the present disclosure;

FIG. 7 illustrates a transmitter block diagram for a PUSCH in a subframe according to embodiments of the present disclosure;

FIG. 8 illustrates receiver block diagram for a PUSCH in a subframe according to embodiments of the present disclosure;

FIG. 9 illustrates a CSI compression method based on an autoencoder according to an embodiment of the present disclosure;

DETAILED DESCRIPTION

Figure 1:
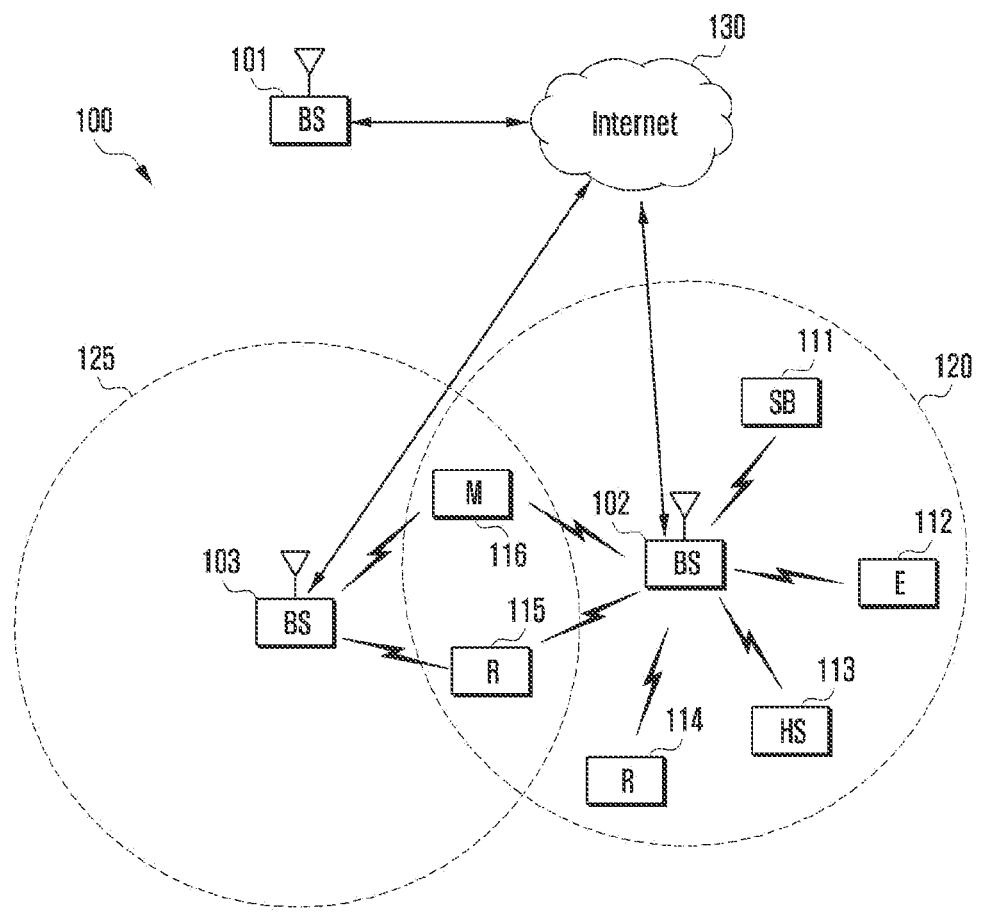
FIG. 1 illustrates an illustrative wireless network according to embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

FIG. 1 to FIG. 13 discussed below and various embodiments used to describe the principle of the disclosure in this patent specification are sorely for illustrative purposes, and should not be construed in any way to limit the scope of the disclosure. Those skilled in the art will understand that the principle of the disclosure is implementable in any suitably arranged system or device.

Aspects, features, and advantages of the disclosure are readily apparent from the following detailed description, simply by illustrating a number of particular embodiments and implementations including the best mode contemplated for carrying out the disclosure. In the disclosure, other and different embodiments are also possible, and some details of the embodiments may be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the accompanying drawings.

In the past 10 years, global mobile data traffic has constantly increased. The International Telecommunication Union (ITU) predicted that the total mobile data traffic would reach 5 zettabytes per month in the future 6G communication system. 5G new radio (NR) mobile communication technology is developing rapidly recently, but it is expected that 5G will reach its limits by 2030. There has been the need for 5G due to Internet-of-Things (IoT) and massive machine-type communication (mMTC). However, 5G is developing in a manner of being highly interconnected to a traditional cellular network.

The European Telecommunications Standards Institute (ETSI) announced 5G-related Tdoc wherein a target peak rate may accomplish 10 Gb/s in uplink and 20 Gb/p in downlink. However, since multi-directional virtual conferences using holographic projection, virtual and augmented reality (VAR), brain communication interfaces, teleportation, and remote surgery, which are discussed as major scenarios of 6G, intensively use a huge amount of data, it is expected that data rate requirements and latency and reliability requirements of each application will obviously exceed the capacity of existing 5G systems. The change of 6G will be absolutely necessary to completely support the services mentioned above. Of course, 6G will continue to benefit from many 5G technologies, but it is expected that new technologies will be needed to meticulously complete 6G.

Based on 5G vision, 6G will continue to support our surroundings to be fully connected with numerous and ultra-smart autonomous services. Widespread proliferation of humanoid robots and intelligent devices capable of making decisions with minimal human intervention will be available. In addition, there will occur the notion of intelligent Internet of Things (IoT) in which everything around us is so intelligent and thus embedded artificial intelligence (AI) capabilities are supported at almost every level from network operation and management to coding, signal processing, and manipulation. Few would disagree that AI will be an essential part of 6G because of data mining and smart structures for service-based context-aware communication, and the availability of big data.

Unlike using existing AI algorithms for 5G mobile communication network data, 6G may realize a collective AI concept to solve the coexistence of multiple distributed mobile wireless training agents. In order to accommodate these changes, devices will experience a paradigm shift in terms of design, operation, size, and chip architecture. Moreover, 6G would undergo a paradigm shift with introduction of a wireless environment in which programming is possible unlike the traditional thinking that a wireless channel is uncontrollable. Accordingly, design freedom of wireless communication systems is expected to be greatly improved.

In line with this direction, there is an attempt to use AI/ML for the physical layer in 3GPP. Especially, in CSI compression, beam management, and positioning scenario proceeding as an Rel-18 study item (SI), AI/ML algorithms are being used in signal compression, signal reconstruction, and signal prediction. Particularly, the key to AI-based CSI compression to be discussed in this patent is to compress and transmit CSI via an AI algorithm instead of a codebook-based CSI feedback method being used in conventional 5G NR, and reconstruct the CSI through a reconstruction CSI report via the AI algorithm. Therefore, quantization error caused by use of quantized DFT beams may be reduced, and information loss which may occur in the process of transferring an estimated channel may be decreased. The increase in the resolution of DFT beams may raise the accuracy of a codebook, but may not be efficient by resulting in the increase of the number of feedback bits. A neural network that is trained based on big data may learn the features between CSIs to enable efficient compression and reconstruction.

AgNB transmits a channel state information-reference signal (CSI-RS) to a UE, and the UE derives estimated channel $\hat{H}$ through channel estimation by using the CSI-RS. ($\hat{H}=UDV^H$) eigenmatrix V is obtained through eigenvalue decomposition (EVD) or singular value decomposition (SVD) for CSI feedback from $\hat{H}$. V is a matrix which may be used in precoding performed by the gNB, and in the current NR R17, the UE searches for a codeword that is the most similar to V in a pre-defined codebook, and transmits a PMI which is the index of the codeword. However, a pre-defined codebook is configured based on a discrete Fourier transform (DFT) beam, and thus MIMO performance degradation is inevitable when the difference between the direction of a column vector configuring actual V and the direction of a DFT beam is large. If the resolution between DFT beams is increased, MIMO performance is enhanced, but the overhead fed back from a UE to a gNB becomes large due to codebook size increment. In order to solve this problem, a UE compresses V via an AI/ML-based encoder and transmits compressed vector z, and a gNB reconstructs V via an AI/ML-based decoder by using the received z. Such AI/ML-based CSI compression is being discussed as a 3GPP R18. A UE may perform compression by using, as an input value of an encoder, a matrix of a DV type obtained by multiplying a singular value or an eigenvalue by V, rather than compressing eigenmatrix V via an AI/ML-based encoder. In this case, the singular value or eigenvalue may denote a value indicating how dominant an eigenvector is in V, and may be used as an index representing a weight of the eigenvector to an estimated channel directionality.

When an AI model is used for AI/ML-based CSI compression, it is generally expected that a pre-trained model is generated through offline learning. However, the inference performance of a pre-trained model decreases for a dataset having an environment characteristic different from that of a dataset used in previous training. Therefore, a process of making a model suitable for an environment through online learning rather than offline learning is needed. That is, a process of training an AI model in real time by using a dataset for a given environment is needed.

Basically, in a case of an autoencoder used in CSI compression, joint training between an encoder and a decoder is required, and thus a gNB or a UE needs to train both. When online learning is performed by a gNB, the gNB is required to receive CSI measurement information (measurement) obtained through measurement by a UE, in order to secure a training dataset. Therefore, overhead is considerably large. Moreover, the CSI measurement information received by the gNB reflects some extent of quantization error, and this error leads to error propagation at the time of training.

The present disclosure is to, for CSI compression, perform online learning-based training, based on data collected in real time for a channel environment between a UE and a gNB, and deploy an autoencoder. Offline learning in which training is performed using a pre-collected dataset employs a pre-trained autoencoder, and thus is not suitable for a situation where a channel environment changes dynamically, or a UE having high mobility. In order to solve this problem, in the disclosure, measurement information collected by a UE in real time is used to perform training through online learning. Accordingly, a UE and a gNB requires advance information required for training, an end time point of training, reporting of a training result, and transmission of a training model. The present disclosure provides a necessary procedure relating to an autoencoder deployment process using online learning.

Figure 2:
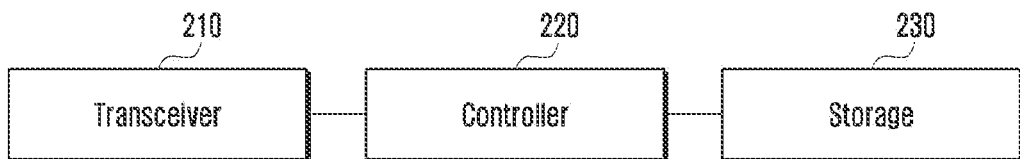
FIG. 2 illustrates a structure of a UE according to an embodiment of the present disclosure.
Figure 3:
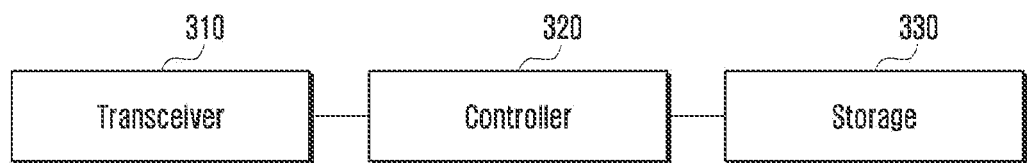
FIG. 3 illustrates a structure of a base station according to an embodiment of the present disclosure.

FIG. 1 to FIG. 4B discussed below are used to describe various embodiments that are implemented in a wireless communication system and are also implemented using orthogonal frequency division multiplexing (OFDM) or orthogonal frequency division multiple access (OFDM A) communication technologies. The descriptions of FIG. 1 to FIG. 3 are not meant to imply physical or architectural limitations to the manner in which different embodiments may be implemented. Different embodiments of the disclosure may be implemented in any suitably-arranged communication system. The disclosure covers several elements which are usable in conjunction or in combination with one another, or are operable independently.

FIG. 1 illustrates an illustrative wireless network according to embodiments of the present disclosure. An embodiment of a wireless network illustrated in FIG. 1 is merely for description. Other embodiments relating to a wireless network 100 may be used without departing from the scope of the disclosure.

As illustrated in FIG. 1, the wireless network includes a gNB 101, a gNB 102, and a gNB 103. The gNB 101 communicates with a gNB 102 and a gNB 103. In addition, the gNB 101 communicates with at least one network 130, for example, Internet, a dedicated Internet protocol (IP) network, or other data networks.

The gNB 102 provides wireless broadband access to the network 130 to first multiple user equipments (UEs) within a coverage area 120 of the gNB 102. The first multiple UEs include a UE 111 which may be located in a small business company, a UE 112 which may be located in a big business company (E), a UE 113 which may be located in a WiFi hot spot (HS), a UE 114 which may be located in a first residential area (R), a UE 115 which may be located in a second residential area (R), and a UE 116 which may be a mobile device (M), such as a mobile phone, a wireless laptop, or a wireless PDA. The gNB 103 provides wireless broadband access to the network 130 to second multiple UEs within a coverage area 125 of the gNB 103. The second multiple UEs include the UE 115 and the UE 116. In some embodiments, one or more gNBs among the gNBs 101-103 may communicate with each other and the UEs 111-116 by using 6G, 5G, LTE, LTE-A, WiMAX, WiFi, or other wireless communication technologies.

According to the network type, the term "base station" or "BS" may indicate a component (or component set) configured to provide wireless access to a network, for example, a transmission point (TP), a transmission-reception point (TRP), an enhanced base station (eNodeB or eNB), a 5G base station (gNB), a macrocell, a femtocell, a WiFi access point (AP), or other wireless-capable devices. The base station may provide wireless access according to one or more wireless communication protocols, for example, wireless interface/access (NR) of 6G or 5G, long term evolution (LTE), LTE-advanced (LTE-A), high speed packet access (HSPA), Wi-Fi 802.11 a/b/g/n/ac, etc. For convenience, the terms "BS" and "TRP" are used interchangeably to indicate a network infrastructure that provides wireless access to a remote terminal in this patent specification. In addition, according to the network type, the term "user equipment" or "UE" may indicate a random component, such as "mobile station," "subscriber station," "remote terminal," "wireless terminal," "reception point," or "user device." For convenience, the terms "user equipment" and "UE" are used in this patent specification to indicate a remote wireless apparatus that wirelessly accesses a BS, regardless of whether the UE is a mobile device (e.g., a mobile phone or a smartphone) or a normal fixed device (e.g., a desktop computer or a bending machine).

Dotted lines show approximate ranges of the coverage areas 120 and 125 that are merely roughly illustrated as circles for an example and description. It should be clearly understood that coverage areas associated with the gNBs, for example, the coverage areas 120 and 125 may have other shapes including irregular shapes according to the configuration of the gNBs, and the change of a wireless environment related to nature and artificial obstacles.

As described below in more detail, one or more among the UEs 111-116 include a circuit, programming, or a combination thereof, which is for using a codebook subset restriction for communication CSI reporting in a wireless communication system. In specific embodiments, one or more among the gNBs 101-103 include a circuit, programming, or a combination thereof, which is for CSI acquisition in a wireless communication system.

FIG. 1 illustrates an example of a wireless network, but various modifications may be applied to FIG. 1. For example, a wireless network may include a random number of gNBs and a random number of UEs in a random proper arrangement. In addition, the gNB 101 may directly communicate with a random number of UEs to provide wireless broadband access to the network 130 to the UEs. Similarly, each of the gNBs 102 and 103 may directly communicate with the network 130 to provide direct wireless broadband access to the network 130 to UEs. In addition, the gNBs 101, 102, and/or 103 may provide access to other or additional external networks, such as external telephone networks or other types of data networks.

FIG. 2 illustrates a structure of a UE according to an embodiment of the present disclosure.

Referring to FIG. 2, a UE may include a transceiver 210, a controller 220, and a storage 230. In the disclosure, the controller may be defined as a circuit or an application-specific integrated circuit, or at least one processor.

The transceiver 210 may transmit or receive a signal to or from another network entity. The transceiver 210 may, for example, receive system information from a base station, or may receive a synchronization signal or a reference signal.

The controller 220 may control the overall operation of the UE according to an embodiment provided in the disclosure. For example, the controller 220 may control a signal flow between blocks to perform operations according to a flowchart described below. Specifically, the controller 220 may measure a training capability of the UE in relation to AI training of an autoencoder and transmit measured training capability information, generate a channel estimation value, based on a CSI-RS received from a base station, and generate a training dataset for the autoencoder. In addition, the controller 220 may perform autoencoder training via an AI model, based on the generated training dataset, and transmit a result of the training to the base station.

The storage 230 may store at least one of information that is transmitted or received via the transceiver 210 and information that is generated via the controller 220. For example, the storage 230 may store training capability information of the UE, decoder information, information on a training completion time point, a training dataset, and information on a result of training an autoencoder.

FIG. 3 illustrates a structure of a base station according to an embodiment of the present disclosure.

Referring to FIG. 3, a base station may include a transceiver 310, a controller 320, and a storage 330. In the disclosure, the controller may be defined as a circuit or an application-specific integrated circuit, or at least one processor.

The transceiver 310 may transmit or receive a signal to or from another network entity. The transceiver 310 may, for example, transmit system information to a UE, or may transmit a synchronization signal or a reference signal.

The controller 320 may control the overall operation of the base station according to an embodiment provided in the disclosure. For example, the controller 320 may control a flow between blocks to perform operations according to a flowchart described below. Specifically, the controller 320 may determine a decoder model and structure, based on training capability information received from a UE, and when a training failure result relating to an autoencoder is received from the UE, control an operation of transmitting, to the UE, an indication such as replacement of the decoder, additional generation of a training dataset, or use of a pre-training dataset.

The storage 330 may store at least one of information that is transmitted or received via the transceiver 310 and information that is generated via the controller 320. For example, the storage 330 may store model information and structure information of available candidate decoders, training capability information received from a UE, and information on a training completion time point, which is to be transmitted to the UE.

Figure 4A:
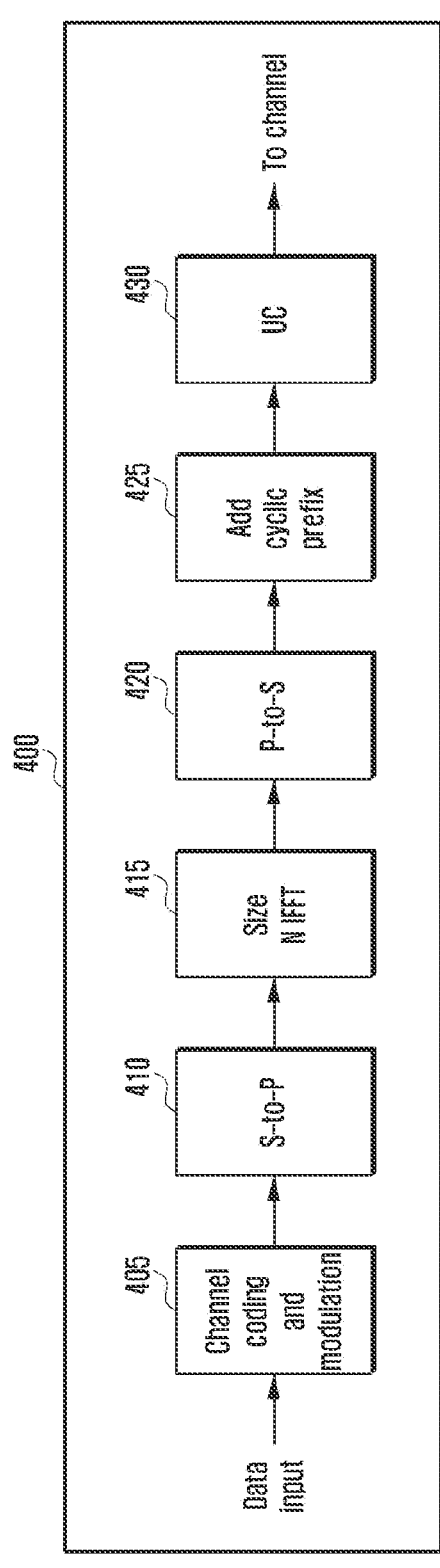
FIG. 4A illustrates a high-level diagram of a transmission path circuit according to embodiments of the present disclosure.
Figure 4B:
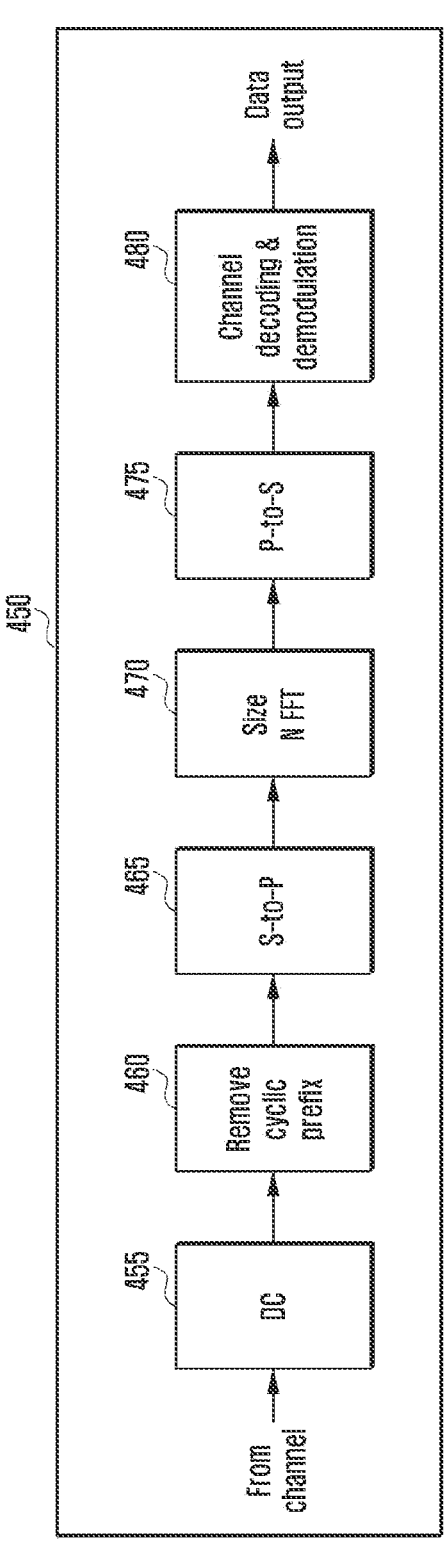
FIG. 4B illustrates a high-level diagram of a reception path circuit according to embodiments of the present disclosure.

FIG. 4A illustrates a high-level diagram of a transmission path circuit according to an embodiment of the present disclosure. For example, a transmission path circuit may be used for orthogonal frequency division multiple access (OFDMA) communication. FIG. 4B is a high-level diagram of a reception path circuit. For example, a reception path circuit may be used for orthogonal frequency division multiple access (OFDMA) communication. In FIG. 4A and FIG. 4B, in a case of downlink communication, a transmission path circuit may be implemented in the base station (gNB) 102 or a relay station, and a reception path circuit may be implemented in a user equipment (e.g., the user equipment 116 in FIG. 1). In other embodiments, in a case of uplink communication, a reception path circuit 450 may be implemented in a base station (e.g., the gNB 102 in FIG. 1) or a relay station, and a transmission path circuit may be implemented in a user equipment (e.g., the user equipment 116 in FIG. 1).

The transmission path circuit includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The reception path circuit 450 includes a down-converter (DC) 455, a remove cyclic prefix block 460, a serial-to-parallel (S-to-P) block 465, a size N fast Fourier transform (FFT) block 470, a parallel-to-serial (P-to-S) block 475, and a channel decoding and demodulation block 480.

At least some of the components of FIG. 4A (reference numeral 400) and FIG. 4B (reference numeral 450) may be implemented as software, and other components may be implemented by configurable hardware or a mixture of software and configurable hardware. Particularly, FFT blocks and IFFT blocks described in the specification of the disclosure may be implemented as configurable software algorithms, and it is noted that the value of size N may change according to the implementation thereof.

In addition, the disclosure relates to an embodiment of implementing fast Fourier transform and inverse fast Fourier transform, but this is merely an example and may not be interpreted as limiting the scope of the disclosure. In other embodiments of the disclosure, it would be understood that fast Fourier transform functions and inverse fast Fourier transform functions may be easily replaced with discrete Fourier transform (DFT) functions and inverse discrete Fourier transform (IDFT) functions, respectively. It may be understood that in a case of DFT functions and IDFT functions, the value of variable N may be a random integer (i.e., 1, 2, 3, 4, etc.), and in a case of FFT functions and IFFT functions, the value of variable N may be a random integer (i.e., 1, 2, 4, 8, 16, etc.) that is a power of 2.

In the transmission path circuit 400, the channel coding and modulation block 405 receives a set of information bits, applies coding (e.g., LDPC coding) thereto, and modulates (e.g., quadrature phase shift keying (QPSK) or quadrature amplitude modulation (QAM)) the input bits, thereby generating a sequence of frequency domain modulation symbols. The serial-to-parallel block 410 converts (i.e., demultiplexes) serially modulated symbols to parallel data to generate N parallel symbol streams, and N is an IFFT/FFT size used in the BS 102 and the UE 116. Thereafter, the size N IFFT block 415 may perform an IFFT operation on the N parallel symbol streams to generate time domain output signals. The parallel-to-serial block 420 converts (i.e., multiplexes) parallel time domain output symbols from the size N IFFT block 415, to generate a serial time domain signal. Thereafter, the add cyclic prefix block 425 inserts a cyclic prefix in the time domain signal. Lastly, the up-converter 430 modulates (i.e., up-converts) the output of the add cyclic prefix block 425 to an RF frequency for transmission through a wireless channel. In addition, this signal may be filtered in a baseband before being converted to an RF frequency.

A transmitted RF signal arrives at the UE 116 after passing through a wireless channel, so that inverse operations for operations in the gNB 102 may be performed. The down-converter (DC) 455 down-converts a received signal to a baseband frequency, and the remove cyclic prefix block 460 removes the cyclic prefix thereof to generate a serial time domain baseband signal. The serial-to-parallel (S-to-P) block 465 converts the time domain baseband signal to parallel time domain signals. Thereafter, the size N FFT block 470 performs an FFT algorithm to generate N parallel frequency domain signals. The parallel-to-serial block 475 converts the parallel frequency domain signals to a sequence of modulated data symbols. The channel decoding and demodulation block 480 demodulates and then decodes the modulated symbols, thereby reconstructing an original input data stream.

Each of the gNBs 101-103 may implement a transmission path similar to downlink transmission to the user equipments 111-116, and implement reception paths similar to uplink reception from the user equipments 111-116. Similarly, each of the user equipments 111-116 may implement a transmission path corresponding to an architecture for uplink transmission to the gNBs 101-103, and may implement a reception path corresponding to an architecture for downlink reception from the gNBs 101-103.

5G communication system use cases have been checked and described. These use cases may be generally classified into three groups. In an example, enhanced mobile broadband (eMBB) is determined such that a high bits per second requirement is performed by less strict latency and reliability requirements. In another example, ultra-reliable and low latency (URLL) is determined as a less strict bits per second requirement. As another example, massive machine type communication (mMTC) is determined such that the number of devices may reach one hundred thousand to a million per km2, but reliability/throughput/latency requirements are less strict. This scenario may also include a power efficiency requirement in that battery consumption is required to be minimized as much as possible.

Additionally, a discussion about use cases of a 6G communication system is in progress, and requirements related to AI/ML would be newly introduced.

A communication system includes downlink (DL) transferring a signal from a transmission point, such as a base station (BS) or a Node B, to a user equipment (UE), and uplink (UL) transferring a signal from a UE to a reception point such as a Node B. Generally, a UE also called a terminal or a mobile station may be a fixed type or a movable type, and may be a mobile phone, a personal computer device, or an automated device. In general, an eNodeB that is a fixed station may also be called an access point or other equivalent terms. In an LTE system, a Node B is often called an eNodeB, and in an NR system, a Node B is often called a gNodeB.

In a communication system, such as an LTE system or an NR system, a DL signal may include a data signal delivering information contents, a control signal delivering DL control information (DCI), and a reference signal (RS) also known as a pilot signal. A base station transmits data information through a physical DL shared channel (PDSCH). A base station transmits DCI through a physical DL control channel (PDCCH) or an enhanced PDCCH (EPDCCH).

A base station transmits acknowledgement information as a response for transmission of a data transport block (TB) from a UE in a physical hybrid ARQ indicator channel (PHICH). A base station transmits one or more of several types of RSs including a UE-common RS (CRS), a channel state information RS (CSI-RS), or a demodulation RS (DMRS). A CRS is transmitted through a DL system bandwidth (BW), and may be used for UEs to obtain a channel estimation value to demodulate data, control information, or perform measurement. In order to reduce CRS overhead, a base station may transmit a CSI-RS having a smaller density than that of a CRS in a time and/or frequency domain. A DMRS may be transmitted only in a BW of a PDSCH or EPDCCH, and a UE may demodulate data or control information in a PDSCH or EPDCCH by using a DMRS. A transmission time interval for a DL channel is a subframe, and for example, may have a duration of 1 millisecond.

A DL signal also includes transmission of a logical channel transferring system control information. A BCCH is mapped to a transmission channel called a broadcast channel (BCH) when the BCCH transfers a master information block (MIB), or is mapped to a DL shared channel (DL-SCH) when the BCCH transfers a system information block (SIB). Most of system information is included in different SIBs that are transmitted using a DL-SCH. The existence of system information on a DL-SCH in a subframe may be expressed by transmission of a corresponding PDCCH transferring a codeword together with a cyclic redundancy check (CRC) scrambled with a special system information RNTI (SI-RNTI). Alternatively, scheduling information for SIB transmission may be provided by a previous SIB, and scheduling information for a first SIB (SIB-1) may be provided by an MIB.

DL resource allocation is performed in a unit of subframes and physical resource block (PRB) groups. A transmission BW includes a frequency resource unit called a resource block (RB). Each RB includes $N_{EPDCCH}$ subcarriers or resource elements (REs)(for example, 12 REs). One RB unit for one subframe is called a PRB. A UE may be allocated $n_s=(n_{s0}+\gamma \cdot N_{EPDCCH})$ mod D RBs for a total of $Z=O_F+[(n_{s0}+\gamma \cdot N_{EPDCCH})/D]$ REs of a PDSCH transmission BW.

A UL signal may include a data signal delivering data information, a control signal delivering UL control information (UCI), and a UL RS. A UL RS includes a DMRS and a sounding RS (SRS). A UE transmits a DMRS only in a BW of a PUSCH or PUCCH. A base station may demodulate a data signal or a UCI signal by using a DMRS. A UE transmits an SRS, thereby providing UL CSI to a base station. A UE transmits data information or UCI through a physical UL shared channel (PUSCH) or a physical UL control channel (PUCCH). When a UE is required to transmit data information and UCI in the same UL subframe, the UE may multiplex both of them in a PUSCH. UCI includes hybrid automatic repeat request acknowledgment (HARQ-ACK) information indicating correct (ACK) or incorrect (NACK) detection of a data TB in a PDSCH or the absence of PDCCH detection (DTX), a scheduling request indicating whether a UE has data in its own buffer, a rank indicator (RI), and a channel state information allowing a Node B to perform link adaptation for PDSCH transmission to a UE. HARQ-ACK information is transmitted by a UE in response to detection of a PDCCH/EPDCCH indicating release of a semi-persistently scheduled PDSCH.

A UL subframe includes two slots. Each slot includes $$N_{symb}^{UL}$$

symbols for transmitting data information, UCI, a DMRS, or an SRS. A frequency resource unit of a UL system BW is an RB. A UE is allocated $N_{RB}$ RBs for a total of $$N_{RB} \cdot N_{sc}^{RB}$$

REs of a transmission BW. In a case of a PUCCH, the equation of $N_{RB}=1$ is satisfied. The last subframe symbol may be used to multiplex SRS transmissions from one or more UEs. The number of subframe symbols available for data/UCI/DMRS transmission is $$N_{symb} = 2 \cdot \left(N_{symb}^{UL} - 1\right) - N_{SRS},$$

and when the last subframe symbol is used to transmit an SRS, the equation of $N_{SRS}=1$ is satisfied, and otherwise, the equation of $N_{SRS}=0$ is satisfied.

Figure 5:
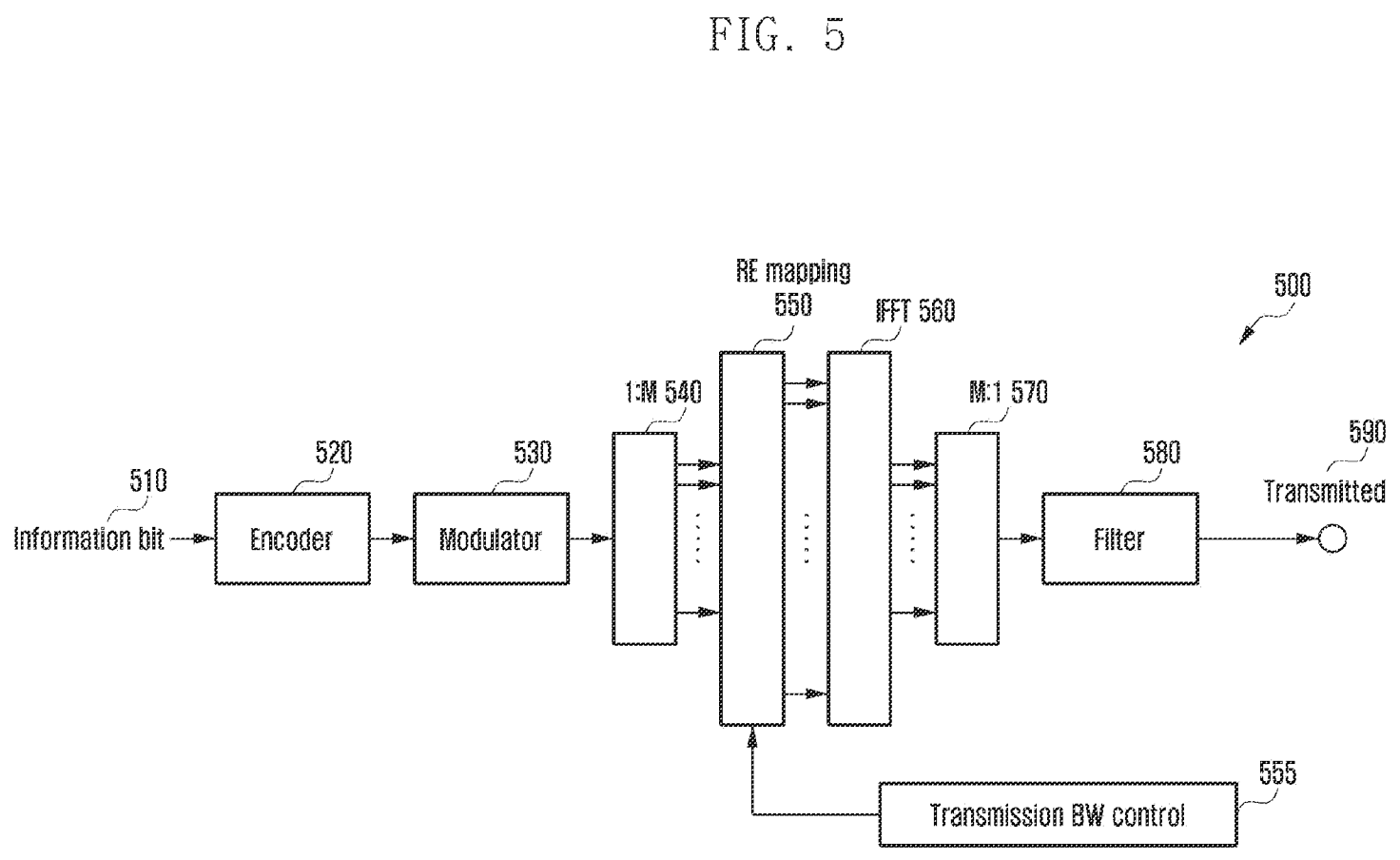

FIG. 5 illustrates a transmitter block diagram 500 for a PDSCH in a subframe according to embodiments of the present disclosure. An embodiment of the transmitter block diagram 500 illustrated in FIG. 5 is merely for description. One or more elements illustrated in FIG. 5 may be implemented as a special circuit configured to perform a mentioned function, or one or more elements may be implemented by one or more processors that execute instructions for performing a mentioned function. FIG. 5 does not limit the scope of the disclosure to a random particular implementation of the transmitter block diagram 500.

As illustrated in FIG. 5, information bits 510 are encoded by an encoder 520, such as a turbo encoder, and is modulated by a modulator 530 through, for example, quadrature phase shift keying (QPSK) modulation. A serial-to-parallel (S/P) converter 540 generates M demodulation symbols that are subsequently provided to a mapper 550 and are to be mapped to REs selected by a transmission BW selection unit 555 with respect to an allocated PDSCH transmission BW, a unit 560 applies inverse fast Fourier transform (IFFT), then a parallel-to-serial (P/S) converter 570 makes an output be serial to generate a time domain signal, a filter 580 filters same, and then a signal is transmitted (as indicated by reference numeral 590). Additional functions, such as data scrambling, cyclic prefix insertion, time windowing, and interleaving, are well known in this technical field, and are not described herein for brevity.

Figure 6:
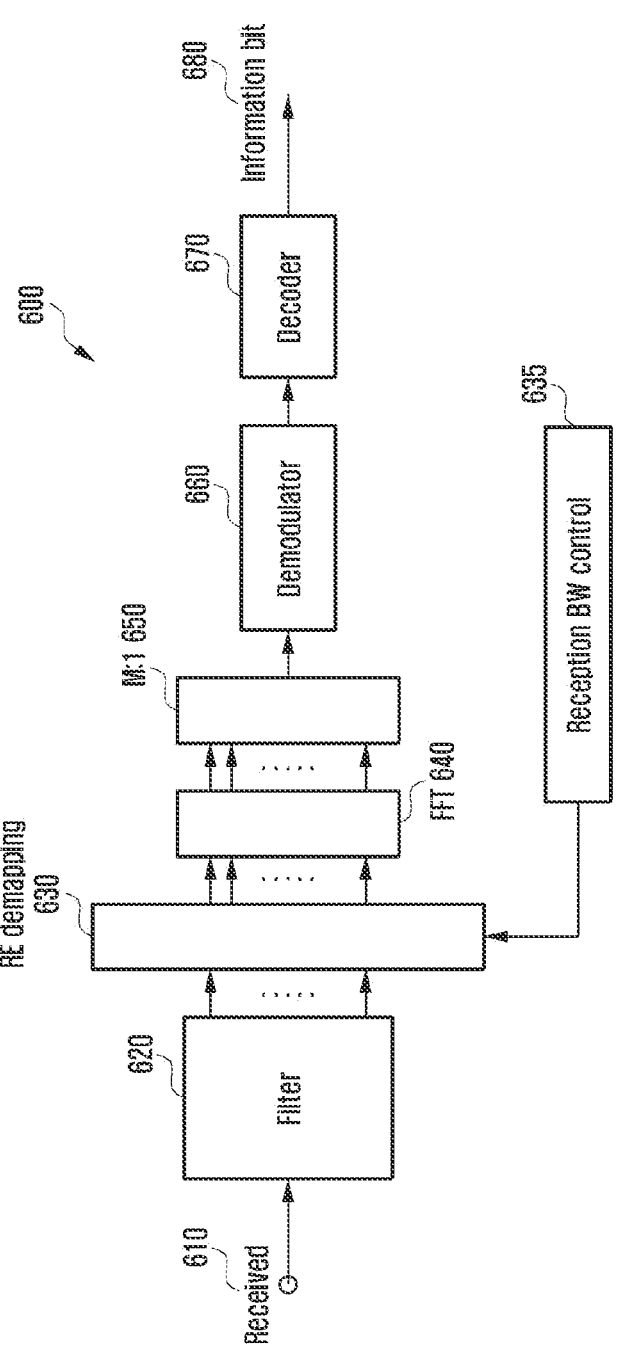
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. An embodiment of the block diagram 600 illustrated in FIG. 6 is merely for description. One or more elements illustrated in FIG. 6 may be implemented as a special circuit configured to perform a mentioned function, or one or more elements may be implemented by one or more processors that execute instructions for performing a mentioned function. FIG. 6 does not limit the scope of the disclosure to a random particular implementation of the block diagram 600.

As illustrated in FIG. 6, a reception signal 610 is filtered by a filter 620, REs 630 of an allocated reception BW are selected by a BW selector 635, a unit 640 applies fast Fourier transform (FFT), and an output is serialized by a parallel-to-serial converter 650. Subsequently, a demodulator 660 applies channel estimates obtained from a DMRS or CRS (not illustrated), to coherently demodulate data symbols, and a decoder 670, such as a turbo decoder, decodes demodulated data to provide an estimate of information data bits 680. Additional functions, such as time windowing, cyclic prefix removal, de-scrambling, channel estimation, and de-interleaving, are not described herein for brevity.

FIG. 7 illustrates a transmitter block diagram 700 for a PUSCH in a subframe according to embodiments of the present disclosure. An embodiment of the block diagram 700 illustrated in FIG. 7 is merely for description. One or more elements illustrated in FIG. 5 may be implemented as a special circuit configured to perform a mentioned function, or one or more elements may be implemented by one or more processors that execute instructions for performing a mentioned function. FIG. 7 does not limit the scope of the disclosure to a random particular implementation of the block diagram 700.

As illustrated in FIG. 7, information data bits 710 are encoded by an encoder 720, such as a turbo encoder, and is modulated by a modulator 730. A discrete Fourier transform (DFT) unit 740 applies DFT to the modulated data bits, REs 750 corresponding to an allocated PUSCH transmission BW are selected by a transmission BW selection unit 755, a unit 760 applies IFFT, and after cyclic prefix insertion (not illustrated), filtering is applied by a filter 770 and a signal is transmitted (as indicated by reference numeral 780).

Figure 8:
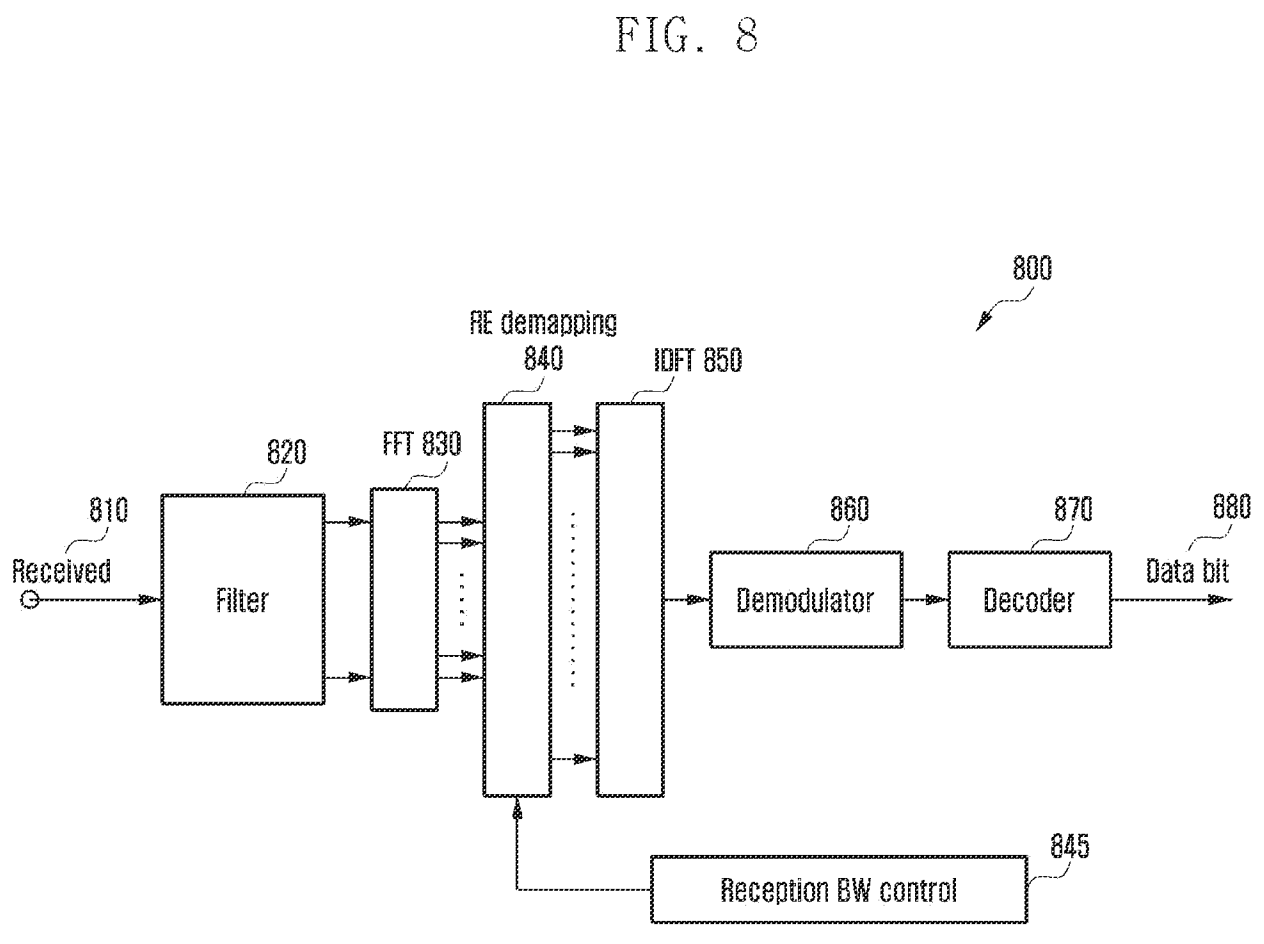

FIG. 8 illustrates a receiver block diagram 800 for a PUSCH in a subframe according to embodiments of the present disclosure. An embodiment of the block diagram 800 illustrated in FIG. 8 is merely for description. One or more elements illustrated in FIG. 8 may be implemented as a special circuit configured to perform a mentioned function, or one or more elements may be implemented by one or more processors that execute instructions for performing a mentioned function. FIG. 8 does not limit the scope of the disclosure to a random particular implementation of the block diagram 800.

As illustrated in FIG. 8, a reception signal 810 is filtered by a filter 820. Subsequently, after a cyclic prefix is removed (not illustrated), a unit 830 applies FFT, REs 840 corresponding to an allocated PUSCH reception BW are selected by a reception BW selector 845, the unit 850 applies inverse DFT (IDFT), a demodulator 860 applies an channel estimate obtained from a DMRS (not illustrated), to coherently demodulate data symbols, and a decoder 870, such as a turbo decoder, decodes demodulated data to provide an estimate of information data bits 880.

Unlike using existing algorithms for mobile communication network data in 5G, 6G or 6th generation cellular systems may realize a collective AI concept to solve the coexistence of distributed mobile wireless training agents. In 6G, a wireless environment in which programming is possible is introducible unlike the traditional thinking that a wireless channel is uncontrollable. Therefore, design freedom of wireless communication systems may be greatly improved.

Accordingly, there is an attempt to use AI/ML for the physical layer in 3GPP, and specifically, methods of using AI/ML algorithms in signal compression, reconstruction, and prediction are being tried.

Figure 9:
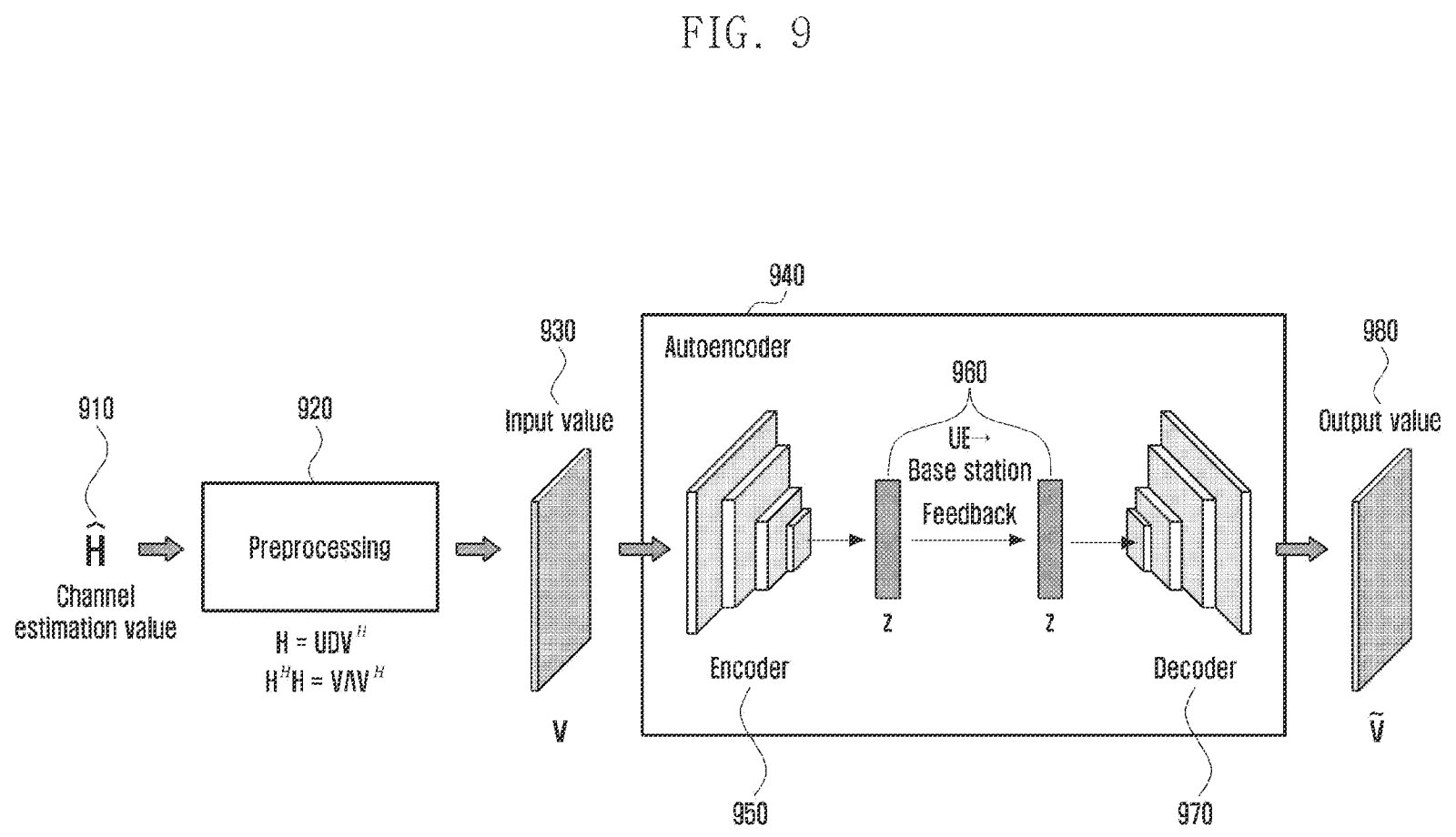

FIG. 9 illustrates a CSI compression method based on an autoencoder according to an embodiment of the present disclosure.

CSI changes according to a channel environment between a base station and a UE, and thus the performance of an AI model for a new channel environment may degrade at the time of using offline learning in which an AI model is trained using a dataset for a particular channel environment. In such a case, in order to improve the performance of an AI model, a different model suitable for a corresponding environment is used, or a fine tuning process of re-training some layers is required.

FIG. 9 illustrates an encoder for compressing feedback information for a channel estimation value and a decoder for reconstructing same, and as illustrated in FIG. 9, the encoder and the decoder are paired and may be called an autoencoder.

That is, an "autoencoder" in this specification may be understood as a concept including an encoder for compressing CSI feedback information calculated through a channel estimate generated using a CSI-RS, and a decoder for reconstructing CSI feedback information compressed by the encoder. Accordingly, training of an autoencoder may imply training of a pair of an encoder and a decoder corresponding thereto.

A CSI compression and reconstruction process illustrated in FIG. 9, a UE may perform the processes of generating a value 910 of channel estimation through reception of a CSI-RS, performing preprocessing 920 of the channel estimation value 910 to generate an input value 930 to be compressed by an encoder 950, compressing the generated input value 930 via the encoder 950 to generate CSI feedback information 960, and transmitting the generated CSI feedback information 960 to a base station.

In FIG. 9, the base station may perform the processes of receiving the CSI feedback information 960 transmitted by the UE, and reconstructing the received CSI feedback information 960 by means of a decoder 970 to generate an output value 980 of an autoencoder 940.

As described above, the encoder 950 among elements included in the autoencoder 940 operates while being provided in the UE, and the decoder 970 may operate while being provided in the base station. The disclosure provides a method of performing online learning of an autoencoder through AI technology by a UE, and accordingly, the UE may train the encoder 950 included in the autoencoder 940 and the decoder 970 corresponding to the encoder 950, and transmit, to the base station, information on the decoder 970 for which training has been completed. The base station may receive, from the UE, information (e.g., information on a model and structure of the decoder or information on a trained weight of the decoder) on the decoder 970, and determine or configure, using the received information, the model and structure of the decoder 970 that is to reconstruct the CSI feedback information 960 received from the UE.

Referring to FIG. 9, the UE may perform channel estimation through a CSI-RS received from the base station, to generate the channel estimation value 910, and convert the channel estimation value 910 into the input value 930 of the encoder through the preprocessing process 920. In the preprocessing process, an eigenmatrix may be calculated through eigenvalue decomposition (EVD) or singular value decomposition (SVD) of the channel estimation value 910. The preprocessing process 920 may be performed through Equation 1 below.

$$\hat{H} = UDV^H \qquad \text{[Equation 1]}$$
$$H^H H = V \Lambda V^H.$$

Thereafter, the UE may compress CSI-related matrix V by means of the encoder 950 to obtain vector z that is calculated in an eigenvector type of a CSI feedback information format, and transmit the calculated vector z to the base station.

According to an embodiment of the disclosure, the format of feedback information for CSI may be configured to an eigenvector type as illustrated in FIG. 9, and according to another embodiment, the format of feedback information for CSI may be configured to a type of a channel estimation value estimated through a CSI-RS. When the format of feedback information for CSI is a type of a channel estimation value, the UE may use the channel estimation value itself as training data.

As described above, the disclosure provides a procedure in which, while there is no separate pre-trained AI model, a UE generates a training dataset through a CSI-RS, performs online learning through the generated training dataset, and transmits the trained decoder to a base station.

Figure 10:
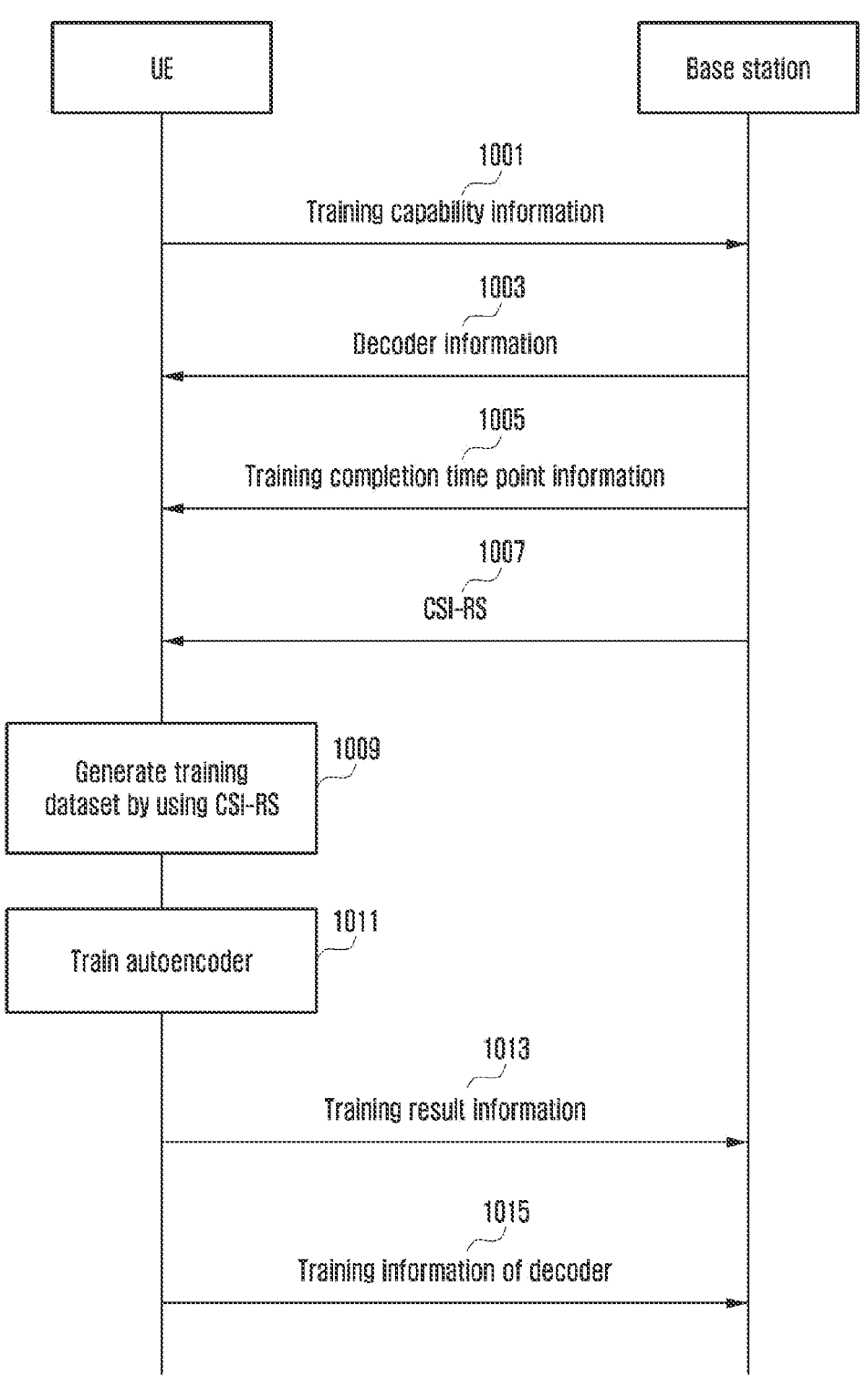
FIG. 10 illustrates a flowchart of a method for performing CSI feedback via an online learning-based UE-driven encoder by a UE and a base station according to an embodiment of the present disclosure.

FIG. 10 illustrates a flowchart of a method of performing CSI feedback via an online learning-based UE-driven encoder by a UE and a base station according to an embodiment of the present disclosure.

As illustrated in FIG. 10, a UE may transmit information on a training capability of the UE to a base station (operation 1001). The training capability of the UE may be a capability for autoencoder training performed in the process of using, by the UE, an artificial intelligence (AI) model to generate feedback information for a CSI-RS.

Basically, in AI/ML-based training, forward propagation of training data is performed and an output value is generated. Thereafter, a loss function (e.g., mean squared error (MSE) or cosine similarity (CS)) between the generated output value ($\hat{V}$ in FIG. 9) and ground-truth data (V in FIG. 9) is calculated, and a weight of a neural network is updated through back propagation. When this process is performed for a large number of pieces of training data, complexity consumed for weight multiplication, bias addition, gradient calculation, etc. becomes considerably large. Therefore, the UE is required to report, to the base station, a capability available for current training in consideration of the training capability of the UE.

The training capability information of the UE may include at least one of latency time information, information on a calculation capability available for training, or trainable AI model size information. The latency time information may be information on a maximum latency time allowed for the UE to train an autoencoder, and a maximum latency time of a decoder considering a latency time caused by an encoder, and the information on the calculation capability available for training may be a type of floating-point operations per second (FLOPs). The size information of the trainable AI model may be information obtained by measuring the size of a used AI model in a unit of bytes.

The process of transmitting the training capability information to the base station by the UE may be performed through the following embodiments.

In one embodiment of Method 1, the UE may designate maximum FLOPs of the base station decoder in consideration of the FLOPs of the encoder and a maximum number of processable FLOPs during training, and report the designated maximum FLOPs to the base station.

In one embodiment of Method 2, the UE may designate a maximum latency time of the base station in consideration of the latency time of the encoder and a maximum latency time allowable during training, and report the maximum latency time to the base station.

In one embodiment of Method 3, the UE may designate a model size of the base station decoder in consideration of a calculation memory and storage available for current training, and report the model size to the base station.

The training capability information that the UE transmits to the base station may be configured through one of method 1 to method 3 above or a combination thereof.

The base station may receive the information on the training capability from the UE, determine decoder information, based on the received training capability information, and transmit the determined decoder information to the UE (operation 1003). The base station may select one of decoder models allowed by the received training capability, and transmit information on the selected decoder model to the UE. The base station may use multiple decoder models so as to select and use a decoder to match a training capability situation of the UE.

Table 1 shows an example of structure information of a decoder selectable by the base station.

TABLE 1

| Type of NN | Num. parameters | Num. FLOPs | Inference latency |
|---|---|---|---|
| Convolutional NN (CNN) | $8 \times 10^4$ | $8 \times 10^5$ | 70 µs |
| Fully-connected NN (FCN) | $7 \times 10^5$ | $2 \times 10^7$ | 180 µs |
| Long short-term memory (LSTM) | $9 \times 10^5$ | $5 \times 10^6$ | 120 µs |

In Table 1, the base station may select a suitable decoder model (e.g., select from among CNN, FCN, and LSTM), based on training capability information received from the UE, and transmit decoder information including decoder structure information of a corresponding model to the UE.

The decoder information may include structure information of a decoder to be trained by the UE. The decoder structure information may include information on a neuron connection method, the number of hidden layers, the number of hidden units, the type of an activation function, a normalization type, and the presence or absence of residual connection.

The base station may transmit information on a training completion time point (training termination point) to the UE (operation 1005).

Training using a conventional AI model may be ended at a point or time point at which a training result for a given dataset converges to a particular value, or at which validation error is minimum. In the disclosure, furthermore, a training completion time point may be determined based on convergence of a training result or validation error.

Even in a communication system, when resources consumed for training are considered, the UE may be informed of a proper completion time point (termination point) to perform training. In a CSI compression process, a method related to convergence or validity, which has been used in conventional AI training, may be used, and a predetermined performance threshold may be indicated to the UE according to system performance requirements.

The process of transmitting the information on the training completion time point to the base station by the UE may be performed through the following embodiments.

In one embodiment of Method 1-1, the base station may indicate CSI compression accuracy satisfying a particular condition to the UE.

In method 1-1, the CSI compression accuracy may be transferred to the UE as a type of block error rate (BLER), mean squared error (MSE), or cosine similarity (CS), and for example, a condition represented by BLER$\leq 10^{-3}$, MSE(V, $\hat{V}$)=$\|V-\hat{V}\|_F \leq 10^{-5}$, or CS(V,$\tilde{V}$)=$|\langle V, \hat{V} \rangle| \geq 0.9$ may be transferred.

In one embodiment of Method 1-2, the base station may indicate, to the UE, CSI reconstruction accuracy relating to a minimum sum-rate in a multi-user multi-input multi-output (MU-MIMO) environment.

In one embodiment of Method 1-33, the base station may indicate, to the UE, CSI reconstruction accuracy enabling minimum user perceived throughput (UPT) to be ensured.

In one embodiment of Method 1-4, the base station may indicate, to the UE, CSI reconstruction accuracy having the level of a DFT-beam-based type 2 codebook being currently operated.

In one embodiment of Method 1-5, the base station may indicate, to the UE, CSI reconstruction accuracy corresponding to the number of bits of CSI feedback information transmitted by the UE so as to reduce feedback overhead.

In one embodiment of Method 1-6, the base station may indicate, to the UE, a maximum latency time occurring from AI model deployment in a communication environment in which a latency time is metric.

In one embodiment of Method 1-7, the base station may indicate the UE to end training at the moment that convergence for the training occurs.

The training completion time point information that the base station transmits to the UE may be configured through one of method 1-1 to method 1-7 above or a combination thereof.

After receiving the decoder information and the information on the training completion time point from the base station, the UE may receive a CSI-RS from the base station (operation 1007). The UE may generate training data corresponding to a CSI feedback information format by using the CSI-RS. As described above, when the feedback information format of CSI is an eigenvector format, the UE may perform singular value decomposition of a channel estimation value generated through the CSI-RS received from the base station, to generate an eigenvector and use same as training data. Unlike the above description, when the format of feedback information for CSI is a type of a channel estimation value, the UE may use the channel estimation value itself as training data.

The UE may train an autoencoder by using a training dataset generated through operation 1009 (operation 1011). The training of the autoencoder may be performed through joint training of a pair of an encoder and a decoder included in the autoencoder.

According to an embodiment, the UE may determine parameters required for training in the process of training the autoencoder. The parameters required for training may include, for example, a loss function, a batch size, and the number of epochs.

The UE may transmit information on a training result to the base station after the training of the autoencoder is ended (operation 1013).

The UE may preferentially transmit information indicating success or failure of autoencoder training to the base station. According to an embodiment, a signal indicating success or failure of autoencoder training may be configured as a type of 1 bit. For example, in a situation where the base station has requested a particular MSE or CS, the UE trains the autoencoder, and then when a validity result satisfies the requirement situation, may transmit a signal indicating success to the base station, and when the validity result does not satisfy the requirement situation, may transmit a signal indicating fail to the base station.

The process of transmitting training result information to the base station by the UE may be conducted according to the following methods.

In one embodiment of Method 2-1, the UE reports, to the base station, information on CSI reconstruction accuracy with respect to training that the UE has performed.

In one embodiment of Method 2-2, the UE reports, to the base station, the number of epochs consumed in training and a time consumed therefor.

In one embodiment of Method 2-3, the UE reports, to the base station, the number of training datasets used in training.

The training result information that the UE transmits to the base station may be configured through one of method 2-1 to method 2-3 above or a combination thereof.

The base station may determine an additional measure for training failure, based on information received from the UE. The additional measure may include replacement of a decoder model, replacement of a decoder structure, and increment of the number of training datasets.

The additional measure taken by the base station against training failure may be performed according to the following methods.

In one embodiment of Method 3-1, the base station transmits, to the UE, an indication for increasing the number of training datasets.

In one embodiment of Method 3-2, the base station transmits, to the UE, an indication for decoder replacement.

A method of performing a measure against training failure by the base station may be configured through one of method 3-1 and method 3-2 above or a combination thereof.

Whether the UE transmits other pieces of information, in the above information on a training result, except information indicating success or failure of autoencoder training may be determined according to success or failure of autoencoder training.

According to an embodiment of the disclosure, the UE may transmit, to the base station, information on a training result described above only when training of the autoencoder has failed, and when training of the autoencoder is successful, may transmit only information indicating training success to the base station.

According to another embodiment of the disclosure, the UE may transmit information on a training result to the base station regardless of whether autoencoder training has succeeded or failed. Information on a training result transmitted by the UE to the base station when autoencoder training has succeeded may also be used in the process of performing, by the base station, user scheduling in a multi-user multiple-input and multiple-output (MU-MIMO) environment.

The UE may transmit training information relating to a decoder to the base station when autoencoder training has succeeded (operation 1015). The training information relating to the decoder may be configured by a training weight value of a decoder structure determined by the base station. In this case, model information and structure information of a decoder to be used by the base station is information already known to the base station and the UE, and thus only a training weight value may be transmitted. The UE may transmit the training information relating to the decoder to the base station through a PUSCH or PUCCH.

When the base station receives a signal indicating success of autoencoder training, the base station may receive a training weight value of a decoder structure from the UE and apply the training weight value to the pre-determined decoder structure, so as to reconstruct CSI feedback information received from the UE in the future.

Figure 11A:
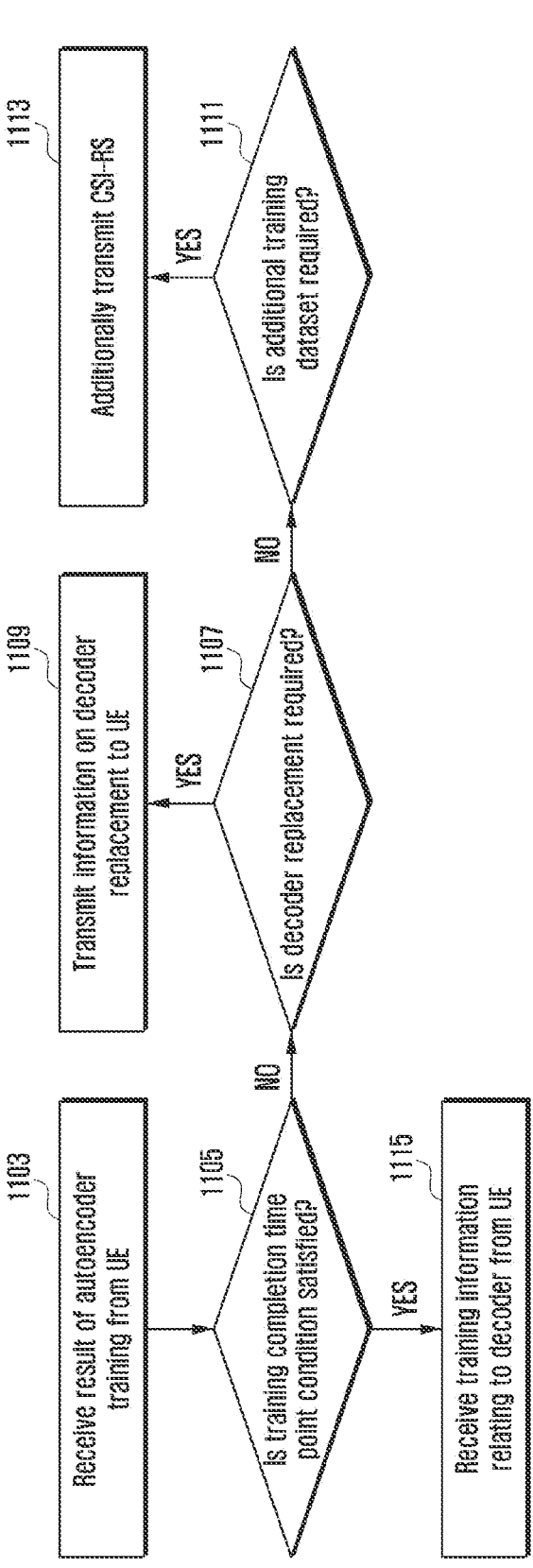
FIG. 11A illustrates a flowchart of a method for determining additional training when a base station receives a signal indicating failure of autoencoder training from a UE according to an embodiment of the present disclosure.

FIG. 11A illustrates a flowchart of a method for determining additional training when a base station receives a signal indicating failure of autoencoder training from a UE according to an embodiment of the present disclosure.

Referring to FIG. 11A, a base station may receive a result of training an autoencoder from a UE (operation 1103).

The base station may determine whether to indicate additional training of the autoencoder to the UE, based on information relating to whether autoencoder training has succeeded or failed, which is received from the UE (operation 1105).

When autoencoder training fails, that is, when autoencoder training performed in the UE does not satisfy a training completion time point condition configured by the base station, the base station may receive a signal indicating failure of training from the UE. The base station may receive a signal indicating failure of training from the UE, or may determine failure of training, based on a training result received from the UE.

The base station may determine whether decoder replacement is needed (operation 1107), and when it is determined that decoder replacement is needed, determine to replace a decoder, and transmit information on a replaced decoder to the UE to indicate additional training or re-training (operation 1109).

Decoder replacement may imply replacement of a decoder model, or may imply change of detailed decoder structure information rather than decoder model replacement.

The base station may determine whether an additional dataset is required (operation 1111), and when it is determined that an additional dataset is required, may transmit an additional CSI-RS, and indicate the UE to additionally generate training data through reception of the additional CSI-RS, and perform additional training or re-training of the autoencoder, based on the additionally generated training data (operation 1113). When it is determined that an additional dataset is required, the base station may transmit a pre-trained dataset to the UE.

In FIG. 11A, when training of the autoencoder fails, provided is an operation order in which the base station preferentially determines whether to replace the decoder, and then determines whether an additional dataset is required. However, the base station may preferentially determine whether an additional dataset is required, and then determine whether decoder replacement is needed, regardless of the above operation order. In addition, the base station may collectively or simultaneously determine whether decoder replacement is needed and whether an additional dataset is required, based on information on a training result received from the UE.

When autoencoder training succeeds, that is, when autoencoder training performed in the UE satisfies a training completion time point condition configured by the base station, the UE may transmit training information relating to the decoder to the base station (operation 1115), and the base station may receive the training information (a training weight value) relating to the decoder from the UE and use same to reconstruct CSI feedback information.

Figure 11B:
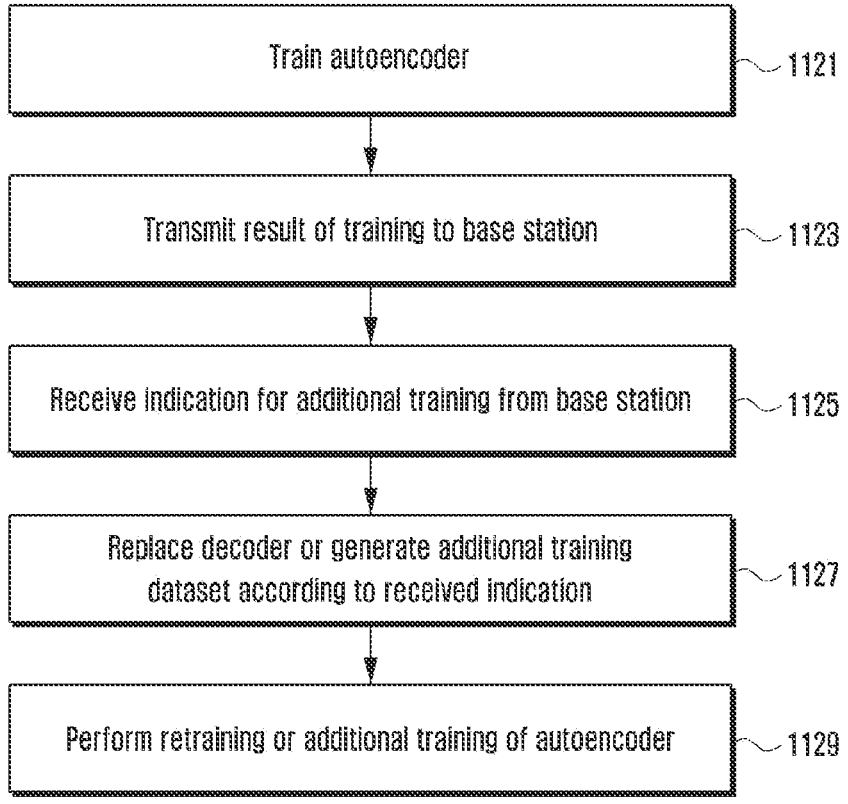
FIG. 11B illustrates a flowchart of an operation for a case where a UE receives an indication of additional training of an autoencoder from a base station according to an embodiment of the present disclosure.

FIG. 11B illustrates a flowchart of an operation for a case where a UE receives an indication of additional training of an autoencoder from a base station according to an embodiment of the present disclosure.

Referring to FIG. 11B, a UE may perform AI model training of an autoencoder through a training dataset autonomously generated by the UE through reception of a CSI-RS, or through a pre-training dataset received from a base station (operation 1121).

The UE may transmit a result of the training to the base station when the training of the autoencoder is ended (operation 1123). The result of the training may include, as described above, information indicating success or failure of the training, CSI reconstruction accuracy information relating to the performed training, information on the number of epochs consumed in the training and a time consumed therefor, and information on the number of training datasets used in the training.

When the training of the autoencoder performed by the UE does not satisfy a training completion time point condition and thus fails, the UE may receive an indication for additional training from the base station (operation 1125).

The indication for additional training may include information on replacement of the decoder model, change of the decoder structure related to layers, generation of an additional training dataset, and use of a pre-training dataset.

The UE may replace the decoder or generate an additional training dataset according to the indication received from the base station (operation 1127). Unlike the above description, the UE may receive a pre-training dataset from the base station.

In addition, methods including replacement of the decoder model, change of the decoder structure, generation of additional training data, and use of a pre-training dataset may be independently indicated, or a combination thereof may be indicated by the base station and performed by the UE.

The UE may perform re-training or additional training of the autoencoder by using the decoder and the training dataset prepared in operation 1127 (operation 1129). Thereafter, the UE may perform an operation of transmitting a result of the re-training or additional training to the base station.

Figure 12:
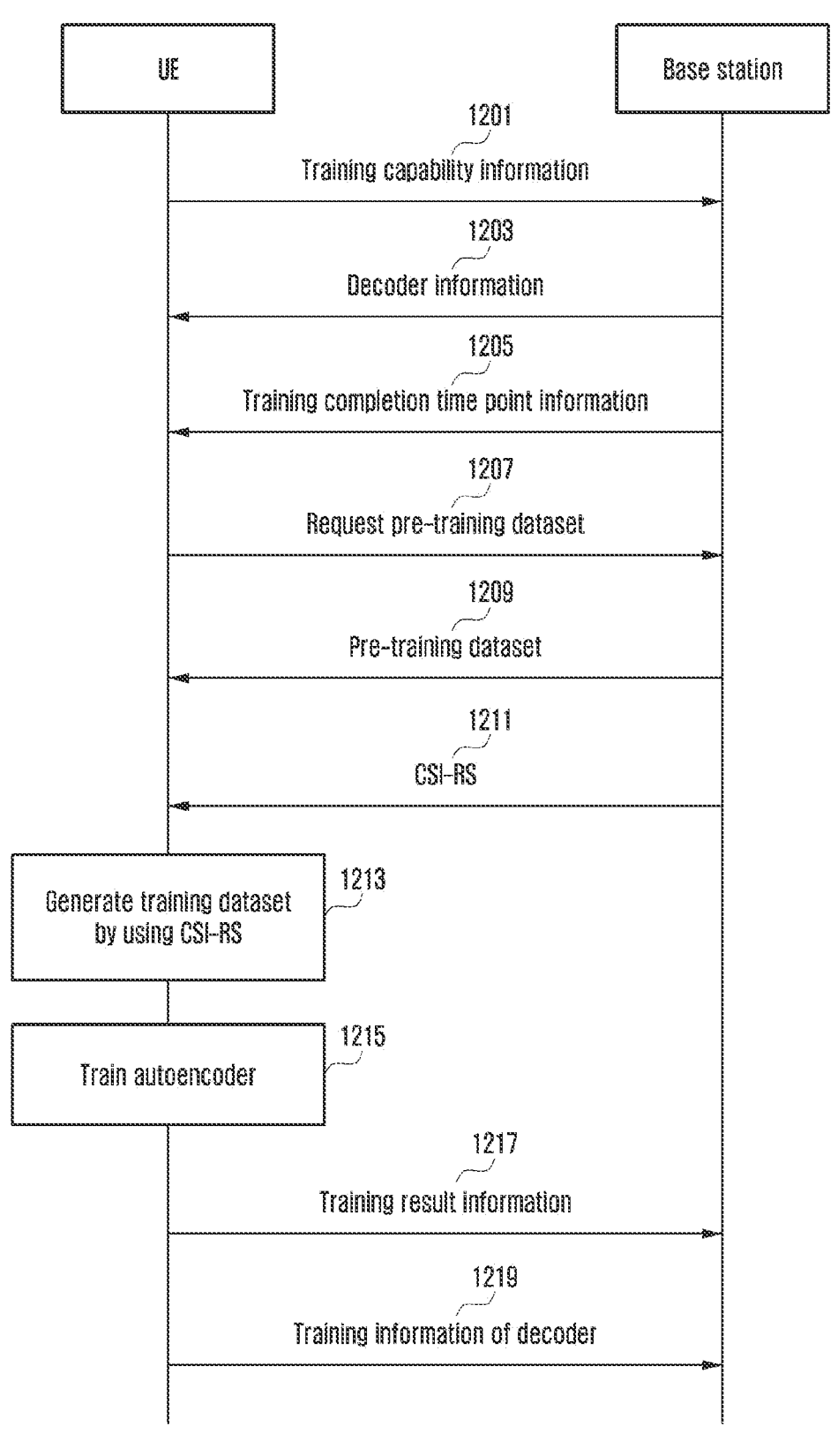
FIG. 12 illustrates a flowchart of a method for performing CSI feedback via an online learning-based UE-driven encoder by a UE and a base station according to an embodiment of the present disclosure.

FIG. 12 illustrates a flowchart of a method for performing CSI feedback via an online learning-based UE-driven encoder by a UE and a base station according to an embodiment of the present disclosure.

Referring to FIG. 12 in comparison with FIG. 10, in FIG. 12, the process in which the UE request a pre-training dataset from the base station (operation 1207) and receives the requested pre-training dataset from the base station (operation 1209) is added.

In FIG. 12, operation 1207 and operation 1209 are illustrated as being performed after operation 1205 of transmitting, by the base station, information on a training completion time point to the UE. However, on the other hand, operation 1207 and operation 1209 may be performed at a random time point before the process in which the UE receives a CSI-RS from the base station (operation 1211) and generates a training dataset, based on the received CSI-RS (operation 1213).

Referring to FIG. 12, a UE may transmit information on a training capability of the UE to a base station (operation 1201). The training capability information of the UE may include, as described above, at least one of latency time information, information on a calculation capability available for training, or trainable AI model size information.

The base station may receive the information on the training capability of the UE from the UE, determine decoder information, based on the received training capability information, and transmit the determined decoder information to the UE (operation 1203). The base station may select one of decoder models selectable based on the training capability received from the UE, and additionally select structure information of the selected decoder model. For example, the base station may determine to use a fully-connected NN (FCN) as a decoder model, and additionally determine decoder structure information of the FCN decoder model, relating to the number of hidden layers, the number of hidden units, the type of an activation function, a normalization type, and the presence or absence of residual connection.

The base station may transmit information on a training completion time point to the UE (operation 1205). According to an embodiment, the decoder information and the training completion time point information transmitted by the base station to the UE may be transmitted through the same channel.

Referring to FIG. 12, after receiving the information on the training completion time point from the base station in operation 1205, the UE may transmit a request for a pre-training dataset to the base station by referring to the information on the training completion time point (operation 1207).

The request for the previous dataset transmitted by the UE to the base station may include request number information of the pre-training dataset, and the request number information of the pre-training dataset may be determined by the UE, based on a reference numerical value required for autoencoder training. The UE may determine the number of training datasets to be generated from a CSI-RS and a request number of pre-training datasets to be requested from the base station, based on a training latency time that is overhead required for training of the autoencoder, and the bandwidth between the UE and the base station.

The request for the pre-training dataset transmitted by the UE to the base station may include location information of the UE. In this case, the base station may receive a request for a pre-training dataset from the UE, and may determine a pre-training dataset to be transmitted to the UE among pre-training datasets stored in the base station, based on location information of the UE. That is, the base station may provide, to the UE, a pre-training dataset specific to the location of the UE.

The UE may receive a pre-training dataset corresponding to the request for the pre-training dataset from the base station (operation 1209). Thereafter, the UE may receive a CSI-RS from the base station, and generate a training dataset for the autoencoder, based on the received CSI-RS (operation 1213).

In the embodiment of the FIG. 12, a pre-training dataset is provided to the UE by the base station, whereby the UE may train the autoencoder, based on the sum of a training dataset autonomously generated through CSI-RS reception, and the pre-training dataset received from the base station (operation 1215).

When autoencoder training is performed using a pre-training dataset, pre-training data may be different from the actual channel environment between the UE and the base station, and thus the performance of the autoencoder may degrade. However, in a case where it is difficult to generate a sufficient amount of training data due to lack of the calculation capability of the UE, or in a case where a CSI-RS period is long and thus a time taken to generate a sufficient amount of training data is long, the UE receives and uses pre-training data from the base station, whereby a condition for a training completion time point may be satisfied even with some degradation of autoencoder performance.

When training of the autoencoder is ended, the UE may transmit training result information to the base station (operation 1217), and when the training is successfully completed, may additionally transmit training information relating to the decoder to the base station (operation 1219). According to an embodiment of the disclosure, the training result information may include training information relating to the decoder.

Figure 13:
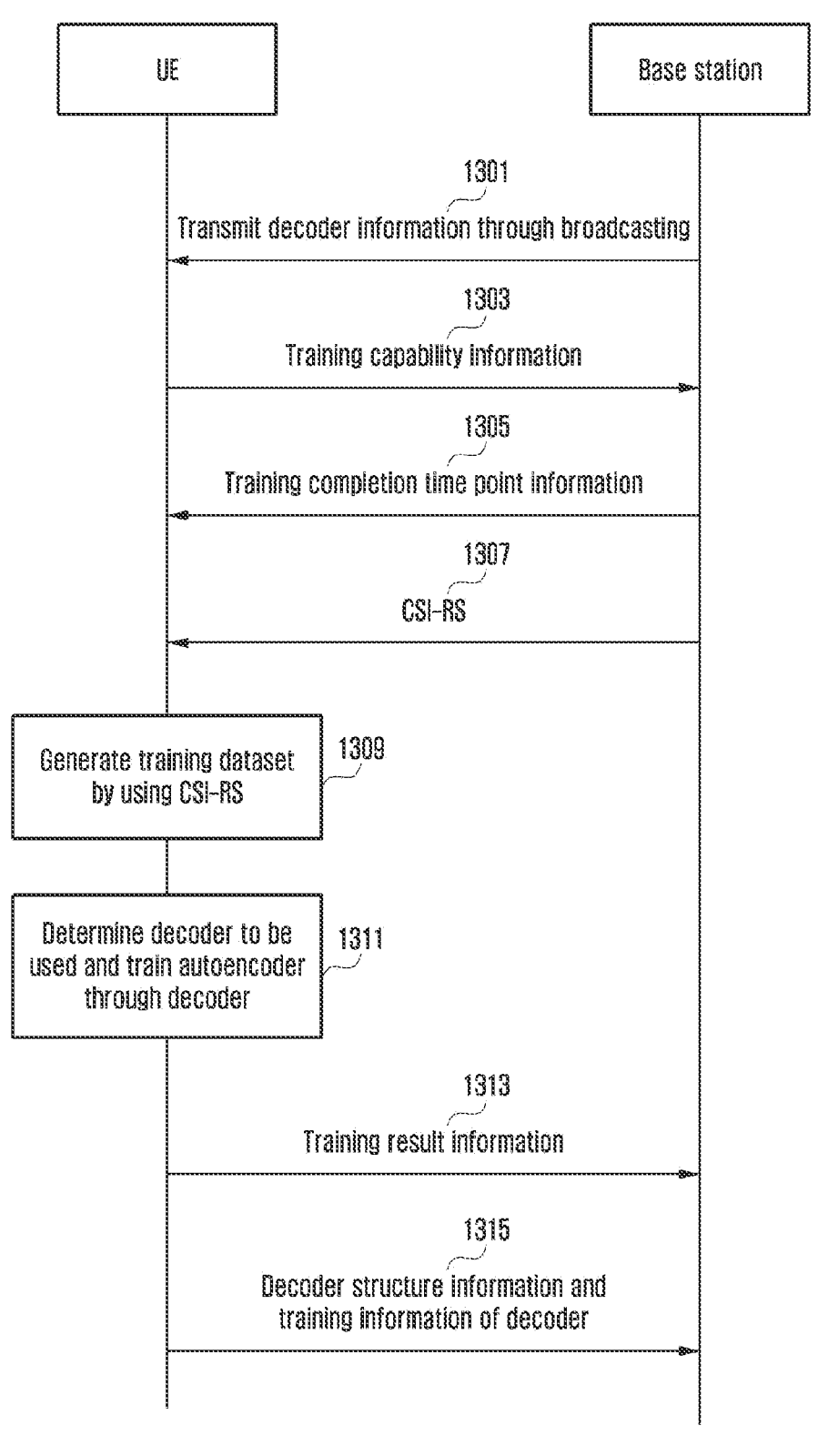
FIG. 13 illustrates a flowchart of a method for performing CSI feedback via an online learning-based UE-driven encoder by a UE and a base station according to an embodiment of the present disclosure.

FIG. 13 illustrates a flowchart of a method for performing CSI feedback via an online learning-based UE-driven encoder by a UE and a base station according to an embodiment of the present disclosure.

When FIG. 13 is compared with FIG. 10, in operation 1301, a UE may preferentially receive information on at least one decoder from a base station, and train an autoencoder, based on the received decoder information.

According to an embodiment of the disclosure, the base station may transmit decoder information relating to at least one decoder through a broadcasting channel (BCH), and the UE may receive the decoder information through the BCH (operation 1301). In this case, in operation 1311 of training the autoencoder, the UE may determine a decoder model to be used, based on information on one or more decoder models and decoder structures, which is included in the decoder information received from the base station, and information on a training completion time point, which is received from the base station, and train an encoder model corresponding to the determined decoder model and structure.

According to an embodiment of the disclosure, operation 1303 of transmitting training capability information by the UE to the base station may be omitted. This is because the UE has already received the decoder information through operation 1301, and if operation 1303 is omitted, the base station may generate training completion time point information without being based on the training capability information, and transmit the generated information to the UE.

The UE may transmit information on a training capability of the UE to the base station (operation 1303), and the base station may determine a training completion time point, based on the training capability information received from the UE, and transmit information on the determined training completion time point to the UE (operation 1305). According to an embodiment of the disclosure, the training capability information transmitted by the UE to the base station may become a trigger signal allowing the base station to transmit training completion time point information to the UE. As described above, operation 1303 of transmitting the training capability information by the UE to the base station may be omitted, and in this case, the UE may transmit a request for training completion time point information to the base station rather than transmitting the training capability information.

The UE may receive one or more CSI-RSs from the base station (operation 1307), and generate a training dataset to be used for training the autoencoder, based on the received CSI-RSs (operation 1309).

Thereafter, based on at least one of the training capability of the UE or the training completion time point information, the UE may select one from among decoder models included in the decoder information received through the BCH in operation 1301, and also determine a detailed structure of the decoder model. The UE may determine the decoder to be used by the base station, and then perform AI model training of the autoencoder including the decoder and an encoder corresponding to the decoder (operation 1311).

The UE may transmit training result information to the base station when the training of the autoencoder is ended (operation 1313). The training result information may include information on a decoder model and a decoder structure and training information relating to the decoder.

The UE may transmit the information on the decoder structure and the training information relating to the decoder to the base station in operation 1315. In comparison with the embodiment described above with reference to FIG. 10, in the embodiment of FIG. 10, a base station determines a decoder model and structure and transmits information on the decoder model and structure to a UE. Therefore, after training of an autoencoder is ended, the UE is not required to transmit the information on the decoder model and structure to the base station, and only transmit training information relating to the decoder. In FIG. 13, the UE may receive information on multiple decoders from the base station in operation 1301, select a decoder model to be used in operation 1311, based on the received information, to train an autoencoder, and transmits training information relating to the decoder to the base station together with model information and structure information of the selected decoder in operation 1315.

The structure information of the decoder may include, as described above, at least one of pieces of information on a neuron connection method, the number of hidden layers, the number of hidden units, the type of an activation function, a normalization type, and the presence or absence of residual connection.

According to an embodiment of the disclosure, only one decoder model and structure may be selected and used, and such a decoder structure and model may be pre-configured. The meaning of being pre-configured in the disclosure may indicate configuration information being pre-stored in a UE, or may also indicate a case where a UE is configured by a base station in a cell-common manner.

Even in a case where a specific decoder model and structure are pre-configured for a UE and a base station, or the base station transmits information on a decoder model and structure to the UE through a BCH, the decoder information may not include information on multiple decoder models, and one decoder model is determined and only information on the decoder model may be included in the decoder information. In such a case, the UE is not required to transmit information on a decoder model and structure to the base station in operation 1315 of FIG. 13, and thus may transmit only training information relating to the decoder to the base station.

In the embodiment described with reference to FIG. 13, an operation in which the UE transmits a request for a pre-training dataset to the base station and receives the pre-training dataset from the base station so as to use, for autoencoder training, the sum of a training dataset autonomously generated through CSI-RS reception and the pre-training dataset may be added.

As described above, according to various embodiments of the disclosure, online learning is performed based on data collected in real time with respect to a channel environment between a UE and a base station, so that the performance of an autoencoder may be improved. That is, rather than offline learning performed through a prepared dataset, online learning performed through a dataset collected in real time is applied to a CSI feedback process, whereby the efficiency of compression and reconstruction of CSI feedback information may be enhanced.

The disclosure has been described with illustrative embodiments, but various changes and modifications may be provided to a person who skilled in the art. It is intended that the disclosure encompass such changes and modifications within the scope of the appended claims. None of the description in this application should be read as implying that any particular element, stage, or function represents an essential element included in the claims. The scope of patented subject matter is defined only by the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a terminal in a wireless communication system, the method comprising:
    transmitting, to a base station, training capability information relating to artificial intelligence (AI) model training of an autoencoder configured to compress and reconstruct feedback information for a channel state information-reference signal (CSI-RS);
    receiving, from the base station, information on a training completion time point and decoder information corresponding to the training capability information, wherein the decoder information includes decoder model information and decoder structure information;
    generating a training dataset for the autoencoder based on at least one received CSI-RS;
    training the autoencoder based on the decoder information, the information on the training completion time point, and the generated training dataset;
    transmitting, to the base station, training result information of the autoencoder; and
    in case that the training result information indicates a failure of autoencoder training, receiving, from the base station, information indicating a replacement of a decoder model or a replacement of a decoder structure.

2. The method of claim 1, wherein the training capability information comprises at least one of latency time information, information on a calculation capability available for training, or trainable model size information.

3. The method of claim 1, wherein the information on the training completion time point comprises at least one of CSI compression accuracy information, CSI reconstruction accuracy information relating to a minimum sum-rate, CSI reconstruction accuracy information for a minimum user perceived throughput (UPT), CSI reconstruction accuracy information corresponding to a discrete Fourier transform (DFT)-beam-based type 2 codebook level, CSI reconstruction accuracy information based on a number of CSI feedback bits of the terminal, a maximum latency time, or an indication indicating end of training in response to convergence of a training result.

4. The method of claim 1, wherein the training result information comprises at least one of a trained weight of a decoder, a one-bit signal indicating a success or a failure of training, CSI compression accuracy information relating to performed training, CSI reconstruction accuracy information relating to performed training, a number of epochs consumed in training, a time consumed for training, or a number of pieces of data used in training.

5. The method of claim 4, further comprising, in case that the one-bit signal indicates a failure of training, receiving, from the base station, at least one of an indication for increment of a number of pieces of training data or an indication for a decoder replacement, or re-training or additionally training information of the autoencoder based on an increased number of pieces of the training data or replaced decoder information.

6. The method of claim 1, further comprising:
    transmitting a request for a pre-training dataset to the base station; and
    receiving at least one pre-training dataset from the base station,
    wherein the autoencoder is trained based on a sum of the generated training dataset and the pre-training dataset.

7. The method of claim 6, wherein the request for the pre-training dataset comprises request number information of the pre-training dataset, and wherein the request number information is determined, by the terminal, based on a reference numerical value required for training the autoencoder and the training capability information.

8. The method of claim 6, wherein the pre-training dataset received from the base station is a dataset selected, by base station, based on location information of the terminal.

9. A terminal in a wireless communication system, the terminal comprising:

a transceiver configured to transmit and receive a signal; and a controller coupled to the transceiver, the controller configured to:

transmit, to a base station, training capability information relating to artificial intelligence (AI) model training of an autoencoder configured to compress and reconstruct feedback information for a channel state information-reference signal (CSI-RS);

receive, from the base station, information on a training completion time point and decoder information corresponding to the training capability information;

generate a training dataset for the autoencoder, based on at least one received CSI-RS;

train the autoencoder, based on the decoder information, the information on the training completion time point, and the generated training dataset;

transmit, to the base station, training result information of the autoencoder; and in case that the training result information indicates a failure of autoencoder training, receiving, from the base station, information associated with a replacement of a decoder model or a replacement of a decoder structure.

10. The terminal of claim 9, wherein the controller is further configured to:

transmit a request for a pre-training dataset to the base station; and receive at least one pre-training dataset from the base station, and wherein the autoencoder is trained based on a sum of the generated training dataset and the pre-training dataset.

11. A method of a base station in a wireless communication system, the method comprising:

receiving, from a terminal, training capability information relating to artificial intelligence (AI) model training of an autoencoder configured to compress and reconstruct feedback information for a channel state information-reference signal (CSI-RS);

determining decoder information, based on the training capability information and transmitting, to the terminal, the determined decoder information and information on a training completion time point;

transmitting at least one CSI-RS to the terminal;

receiving training result information of the autoencoder from the terminal; and in case that the training result information indicates a failure of autoencoder training, determining a replacement of a decoder model or a replacement of a decoder structure, and transmitting, to the terminal, information indicating the replacement of a decoder model or the replacement of a decoder structure.

12. The method of claim 11, wherein the training capability information comprises at least one of latency time information, information on a calculation capability available for training, or trainable model size information.

13. The method of claim 11, wherein the information on the training completion time point comprises at least one of CSI compression accuracy information, CSI reconstruction accuracy information relating to a minimum sum-rate, CSI reconstruction accuracy information for a minimum user perceived throughput (UPT), CSI reconstruction accuracy information corresponding to a discrete Fourier transform (DFT)-beam-based type 2 codebook level, CSI reconstruction accuracy information based on a number of CSI feedback bits of the terminal, a maximum latency time, or an indication indicating end of training in response to convergence of a training result.

14. The method of claim 11, wherein the training result information comprises at least one of a trained weight of a decoder, a one-bit signal indicating a success or a failure of training, CSI compression accuracy information relating to performed training, CSI reconstruction accuracy information relating to performed training, a number of epochs consumed in training, a time consumed for training, or a number of pieces of data used in training.

15. The method of claim 14, further comprising, in case that the one-bit signal indicates a failure of training, transmitting, to the terminal, at least one of an indication for increment of a number of pieces of training data or an indication for a decoder replacement.

16. The method of claim 11, further comprising:

receiving a request for a pre-training dataset from the terminal; and transmitting at least one pre-training dataset to the terminal, wherein the autoencoder is trained based on a sum of the training dataset generated by the terminal and the pre-training dataset.

17. The method of claim 16, wherein the request for the pre-training dataset comprises request number information of the pre-training dataset, and wherein the request number information is determined, by the terminal, based on a reference numerical value required for training the autoencoder, and the training capability information.

18. The method of claim 16, wherein the pre-training dataset transmitted to the terminal is a dataset selected, by the base station, based on location information of the terminal.

19. A base station in a wireless communication system, the base station comprising:

a transceiver configured to transmit and receive a signal; and a controller coupled to the transceiver, the controller configured to:

receive, from a terminal, training capability information relating to artificial intelligence (AI) model training of an autoencoder configured to compress and reconstruct feedback information for a channel state information-reference signal (CSI-RS);

determine decoder information, based on the training capability information and transmit, to the terminal, the determined decoder information and information on a training completion time point;

receive training result information of the autoencoder from the terminal; and in case that the training result information indicates a failure of autoencoder training, determine a replacement of a decoder model or a replacement of a decoder structure, and transmit, to the terminal, information indicating the replacement of a decoder model or the replacement of a decoder structure.

20. The base station of claim 19, wherein the controller is further configured to:

receive a request for a pre-training dataset from the terminal; and transmit at least one pre-training dataset to the terminal, and wherein the autoencoder is trained based on a sum of a training dataset generated by the terminal and the pre-training dataset.

\* \* \* \* \*